United States Patent
Biegelsen

(10) Patent No.: US 7,482,729 B2
(45) Date of Patent: Jan. 27, 2009

(54) HYPERSONIC TRANSDUCER

(75) Inventor: David K. Biegelsen, Portola Valley, CA (US)

(73) Assignee: Xerox Corporation, Norwalk, CT (US)

( * ) Notice: Subject to any disclaimer, the term of this patent is extended or adjusted under 35 U.S.C. 154(b) by 44 days.

(21) Appl. No.: 11/959,118

(22) Filed: Dec. 18, 2007

(65) Prior Publication Data

US 2008/0093952 A1 Apr. 24, 2008

Related U.S. Application Data

(62) Division of application No. 10/800,869, filed on Mar. 16, 2004, now Pat. No. 7,313,242.

(51) Int. Cl.
H02N 1/00 (2006.01)

(52) U.S. Cl. .................................... 310/309

(58) Field of Classification Search ........... 310/309, 310/322, 328, 334; 381/77, 97
See application file for complete search history.

(56) References Cited

U.S. PATENT DOCUMENTS

| | | | |
|---|---|---|---|
| 4,823,908 A | 4/1989 | Tanaka et al. | |
| 5,859,915 A | 1/1999 | Norris et al. | |
| 5,889,870 A | 3/1999 | Norris | |
| 6,370,005 B1 * | 4/2002 | Sun et al. | 361/234 |
| 6,577,738 B2 | 6/2003 | Norris et al. | |
| 6,791,519 B2 * | 9/2004 | Aarts et al. | 345/87 |
| 6,850,623 B1 | 2/2005 | Norris et al. | |
| 7,130,430 B2 | 10/2006 | Milsap | |
| 7,196,599 B2 * | 3/2007 | Dabbaj | 335/78 |
| 2001/0007591 A1 | 7/2001 | Pompei | |
| 2003/0185405 A1 | 10/2003 | Spencer et al. | |
| 2005/0082946 A1 * | 4/2005 | Takeuchi et al. | 310/328 |
| 2005/0152561 A1 | 7/2005 | Spencer | |
| 2007/0154036 A1 * | 7/2007 | Matsuzawa | 381/116 |

FOREIGN PATENT DOCUMENTS

JP 63-193706 * 8/1988 ............. 381/97

OTHER PUBLICATIONS

Carnett, "Grand Award Winner Hypersonic Sound, 15th Annual Best of What's New General Tech," Popular Science, pp. 94 and 130, Dec. 2002.
Croft et al. "Theory, History, and the Advancement of Parametric Loudspeakers, A Technology Overview," American Technology Corporation, pp. 1-27, 2001.
Masahide et al., "The audio spotlight: An application of nonlinear interaction of sound waves to a new type of loudspeaker design," J. Acoust. Soc. Am. 73 (5), pp. 1532-1536, May 1983.

* cited by examiner

Primary Examiner—Thomas M Dougherty
(74) Attorney, Agent, or Firm—Oliff & Berridge, PLC

(57) ABSTRACT

This invention provides methods and apparatus for focusing a hypersonic beam to control both a direction and depth of audible information delivery. Signals that are delivered to each of a plurality of hypersonic transducer elements are adjusted in phase so that transmitted hypersonic signals are focused at a focal point anywhere in space. The focal point of a focused hypersonic beam may be used to scan a space of interest when used in a receive mode in a pinging process. When objects are detected, a focused hypersonic beam may be used to deliver audible information substantially only to a neighborhood of the detected object.

7 Claims, 23 Drawing Sheets

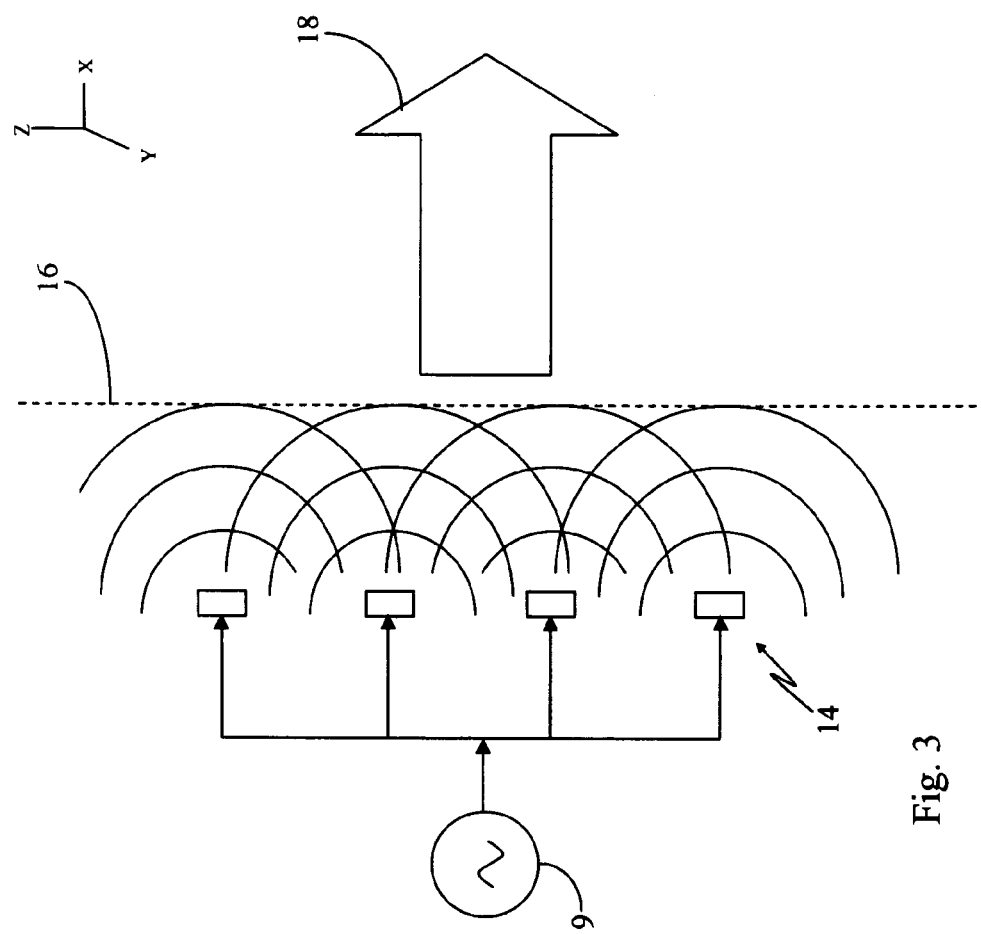
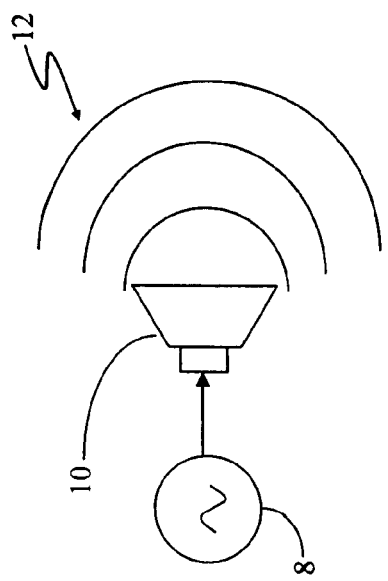
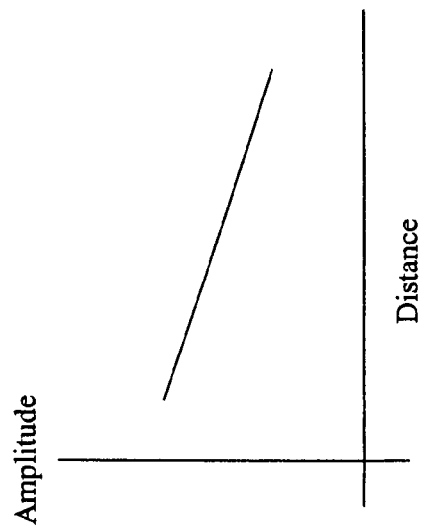

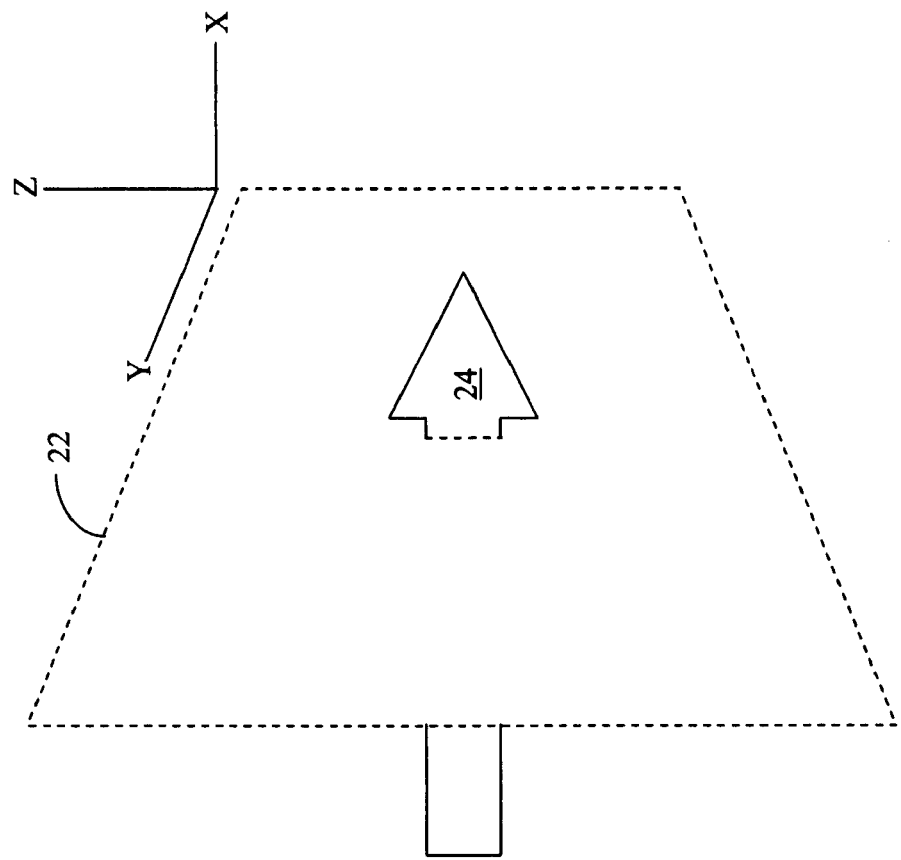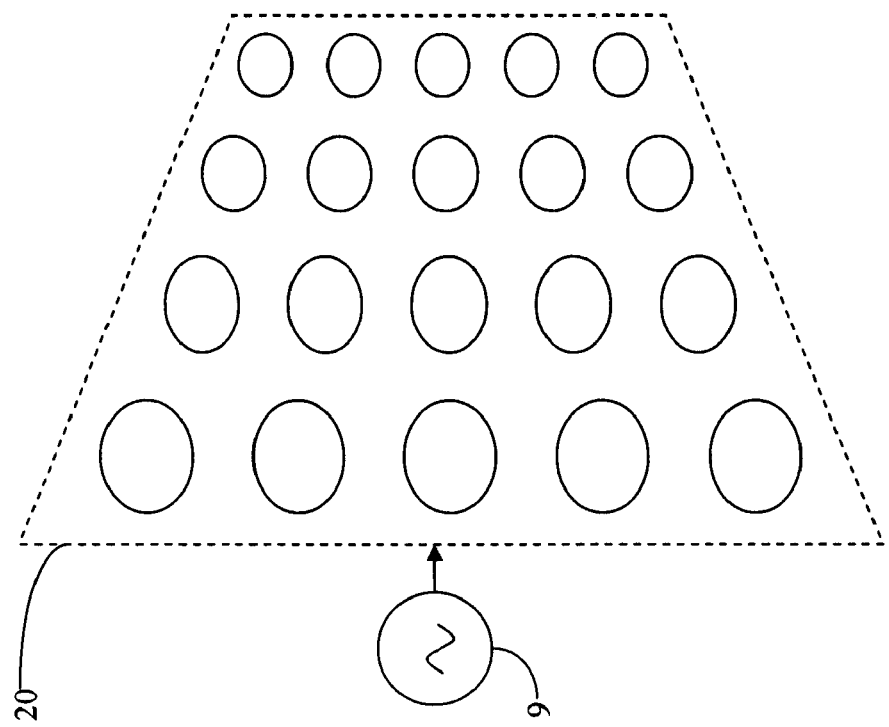
Fig. 4

HYPERSONIC TRANSDUCER

This application is a divisional of U.S. patent application Ser. No. 10/800,869 filed Mar. 16, 2004, which is hereby incorporated herein by reference in its entirety.

BACKGROUND OF THE INVENTION

1. Field of Invention

This invention relates to hypersonic audio communications.

2. Description of Related Art

Transmission of sound waves through air may be divided into small signal and large signal transmissions. Air is substantially a linear medium for small signal transmission. However, the response of air to transmission of large amplitude signals is not substantially linear permitting audible sound to be transmitted using hypersonic (non-audible) signals.

SUMMARY OF THE INVENTION

This invention provides methods and apparatus for focusing a hypersonic beam to control both a direction and depth of audible information delivery. Instead of transmitting hypersonic signals using a plurality of hypersonic transducer elements driven by an exact same signal, signals delivered to each of a plurality of hypersonic transducer elements are adjusted in phase so that transmitted hypersonic signals are focused at a focal point anywhere in space. The focal point of a focused hypersonic beam may be used to scan a space of interest, such as an auditorium, for example, in a pinging process. When objects are detected (e.g., people) using hypersonic or other techniques, the focused hypersonic beam may be used to deliver audible information substantially only to a neighborhood of the detected object.

This invention also provides hypersonic transducer element array structures for producing the focused hypersonic beam. Using the hypersonic transducer element array as a phased array of transducer elements, focused beams of hypersonic signals carrying audio information may be used to deliver audible sounds anywhere in a specified space.

BRIEF DESCRIPTION OF THE DRAWINGS

The systems and methods of this invention are described in detail, with reference to the following figures, wherein:

FIG. 1 illustrates an exemplary audio signal emitter;

FIG. 2 is an exemplary illustration of amplitude variation over distance for an audio signal emitted by the audio signal emitter of FIG. 1;

FIG. 3 illustrates a linear array of hypersonic transducer elements that forms a conic shape wavefront;

FIG. 4 shows a two-dimensional planar array of hypersonic transducer elements that generates a planar wavefront;

DETAILED DESCRIPTION OF PREFERRED EMBODIMENTS

Figure 5:
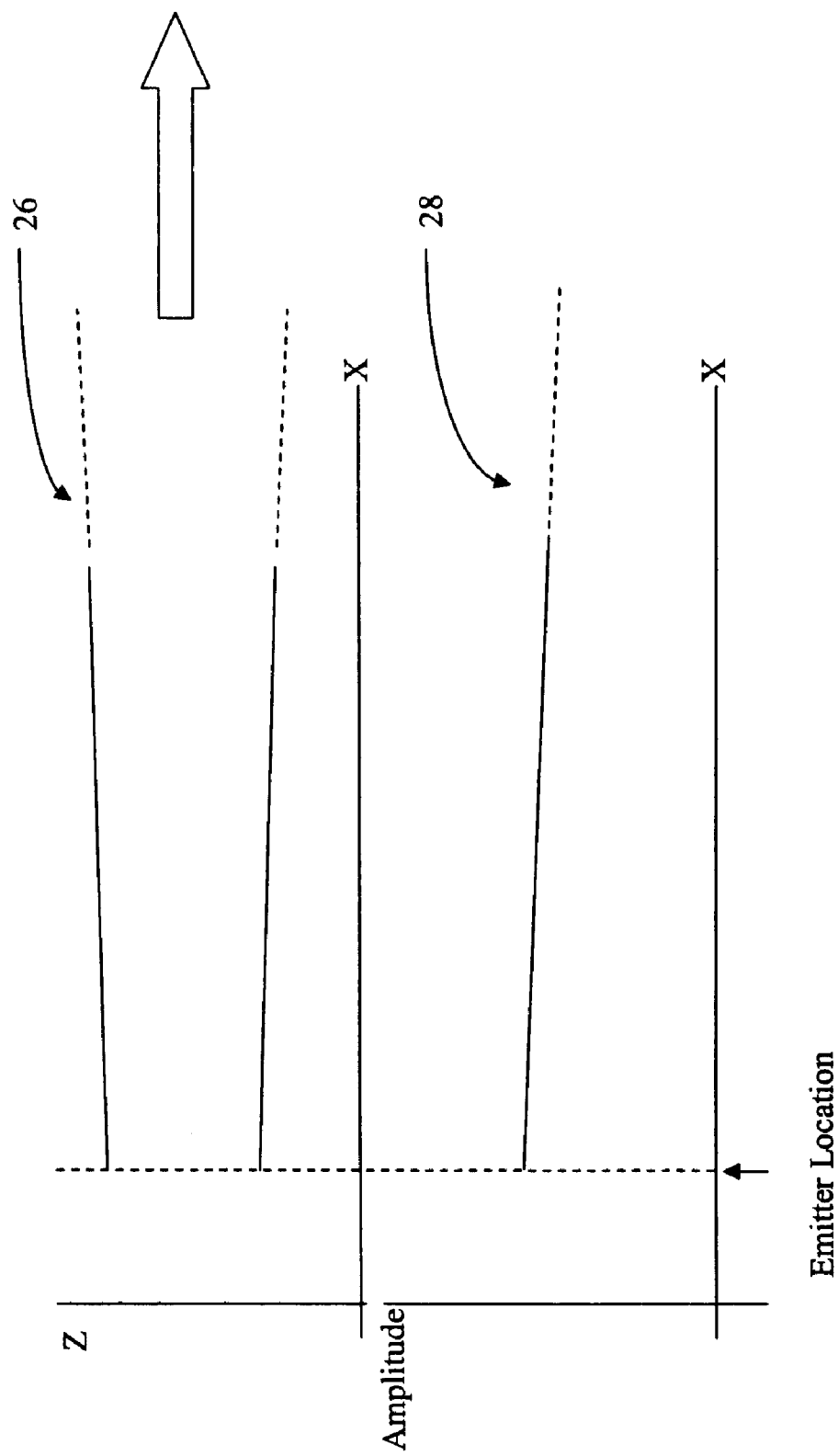
FIG. 5 shows exemplary diagrams of spatial configuration and amplitude variation of the planar wave shown in FIG. 4 over distance.

Transmission of audio information may be performed by familiar sound systems using a loud speaker, for example. As shown in FIG. 1, a signal generator 8 drives a loud speaker 10 to generate audio signal 12 in the form of pressure waves propagating in the air. The sound waves from the loudspeaker 10 propagates in ever expanding spherical wavefronts so that an amplitude of the sound waves decreases with the square of the distance away from the loud speaker 10 (i.e., proportional to $1/d^2$ where d is the distance from the sound source). For simplicity, FIG. 2 shows a representation of this decrease in amplitude by a line sloping downwards as the distance from the speaker increases.

Audio information may be transmitted over air using hypersonic waves (pressure waves at frequencies higher than the audible range of 20-20 kHz) due to non-linear large signal response of air. Air is substantially a linear transmission medium for signals of small amplitudes; that is, the compression of the air is directly proportional to the amplitude of the pressure variation. However, for large amplitudes, air's response to high pressure is different than for low pressure.

This "non-linear" response effectively transfers energy from a frequency of a transmitted signal to other frequencies. In particular, when two frequencies ($f_1$ and $f_2$) of hypersonic signals are transmitted together at large amplitudes in air, air's non-linear response can convert a large portion of the energy of the two frequencies into energy at a difference frequency ($f_d=|f_1-f_2|$) and a sum frequency ($f_s=f_1+f_2$) similar to a mixer function known as heterodyning. Thus, when the difference frequency $f_d$ is within the audio range (20-20 kHz), the transmitted hypersonic signal is converted to an audio signal. This heterodyning effect may occur in any transmission medium that has a non-linear response to a transmitted signal.

Based on the above, audio signals can be transmitted using hypersonic carriers by generating a side band encoding audio information. When transmitted at high enough amplitudes, the hypersonic carrier and the side band will be converted by the air to the audio signal, thus delivering audio information using a hypersonic signal. The hypersonic carrier signal and the side band signal can also be transmitted separately using different hypersonic transducer elements. While it is more difficult to ensure that the hypersonic carrier and the side band maintain a consistent phase relationship as would be possible if these two signals are transmitted together as a single signal, nevertheless, these signals may be converted by the air into an audible audio signal by the air.

As noted above, air is substantially linear for small signals. However, heterodyning does occur even for small signals, but the effect is so small that it is not noticeable. As the amplitude of a transmitted signal increases, the movement of energy from one frequency to another becomes more noticeable. Thus, a threshold may be established at an amplitude of hypersonic signal above which conversion of hypersonic energy to audio energy may be said to occur. This threshold may be used to define a neighborhood within which audio information may be considered to be transmitted or delivered. The size of the neighborhood may depend on an amount of hypersonic energy converted to audio energy, absorption (i.e., conversion to heat) or dispersion (amplitude reduced by scattering to below a noise level), for example. Thus, the boundaries of the neighborhood may be determined by intensity of a hypersonic beam, the efficiency of the hypersonic to audio frequency conversion, and the absorption and dispersion of the hypersonic and audio energies. Audio signals converted from hypersonic signals may be "heard" within the neighborhood because the audio signals are above the threshold. The audio signals converted from hypersonic beams emanate as if from a source located at the neighborhood.

FIG. 3 shows a transducer element array 14 (e.g., hypersonic transmitters/receivers) driven by a signal generator 9 so that the same signal drives each of the transducer elements in the transducer element array 14. Each of the transducer elements generates wavelets such as a wavefront shown in FIG. 1. The combination of all the wavelets via constructive and destructive interference forms a wavefront 16 that is linear in a Z direction. This wavefront 16 propagates in a direction shown by an arrow 18 that is perpendicular to a line formed by the transducer element array 14.

FIG. 4 shows a two-dimensional transducer element array 20 driven by the signal generator 9 so that each of the transducer elements in the transducer element array 20 is driven by the same signal. This transducer element array configuration generates a planar wavefront 22 that moves in a direction indicated by the arrow 24 that is perpendicular to a plane of the transducer element array 20. FIG. 5 shows in graphical form a wavefront configuration 26, seen from the side, as it extends in the direction of propagation, and a signal amplitude 28 as a function of distance from the location of the transducer element array 20. As shown, the planar wavefront 22 disperses laterally as it propagates along the transmitted direction. The amplitude decreases with distance from the transducer element array 20 due to absorption, dispersion, etc.

Figure 6:
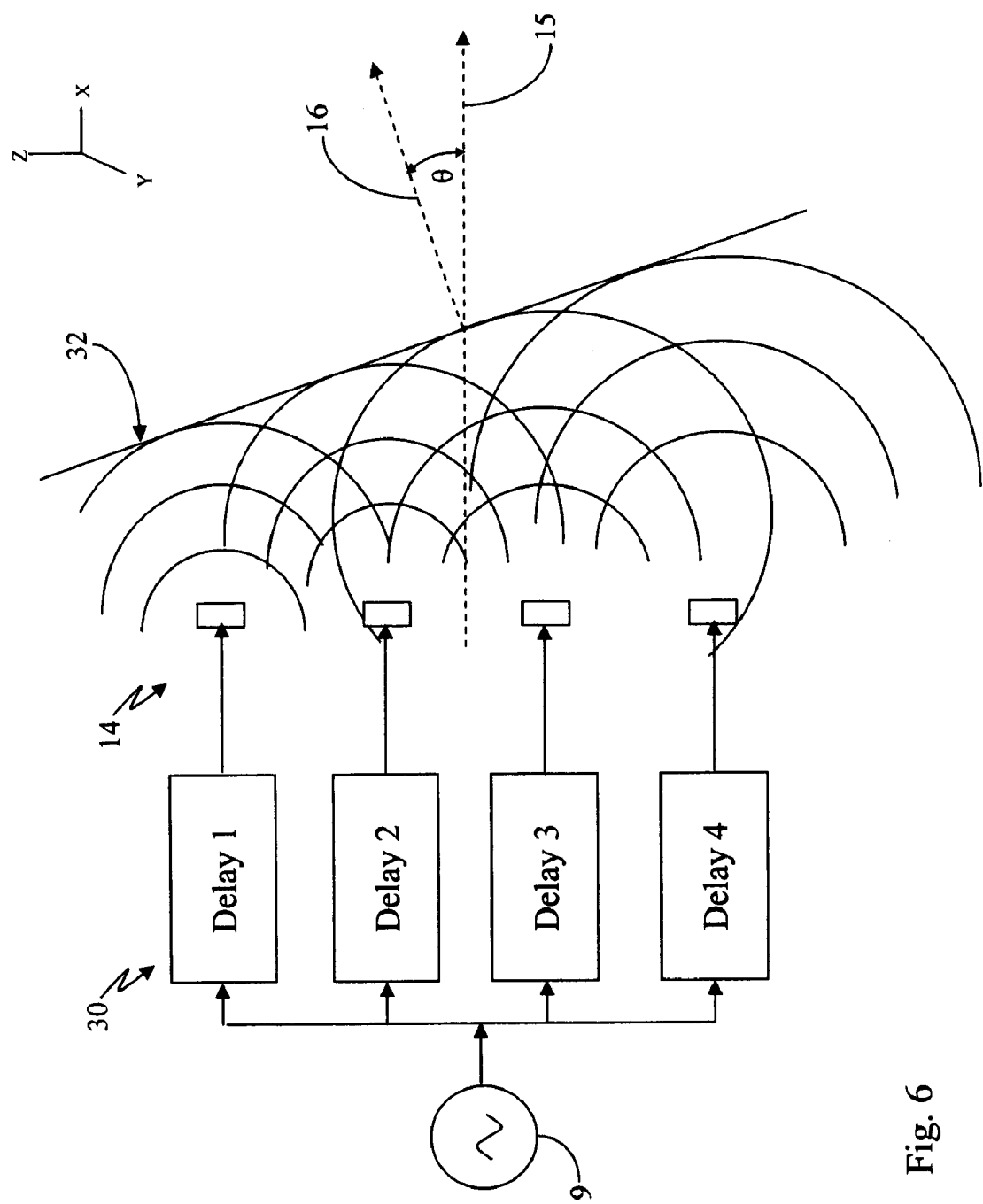
FIG. 6 shows the linear array of transducer elements shown in FIG. 3 driven by copies of a hypersonic signal that are phase-shifted from each other by delays to form a wavefront having a selective direction.

FIG. 6 shows the transducer element array 14 being driven by delayed versions of the signal generated by the signal generator 9. The delay generator 30 applies delays to the signal from the signal generator 9 before outputting a separate delayed signal to each of the transducer elements in the transducer element array 14. For example, the relationship of delays 1-4 may be set as: delay 1>delay 2>delay 3>delay 4. If the spacing between transducer elements is the same and the differences between delays of adjacent transducer elements are the same, then the transducer element array 14 generates a wavefront 32 having an axis 16 that forms an angle θ with respect to an axis 15 of the transducer element array 14. In this way, the wavefront 32 may be directed to any direction by setting the delay values of the delays 1-4.

Figure 7:
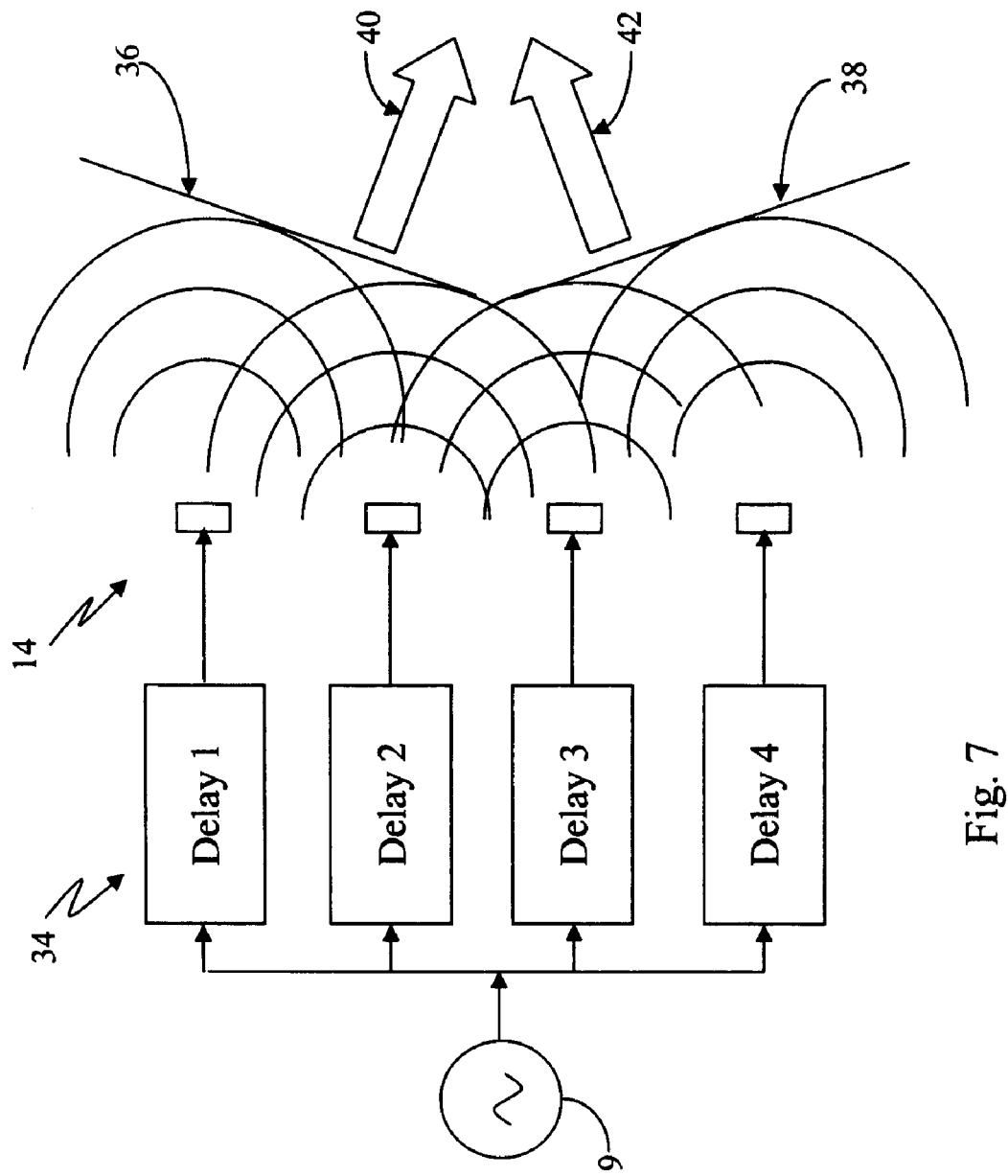
FIG. 7 shows the linear array of transducer elements that are driven by four copies of a hypersonic signal delayed from each other to form a focused wavefront.

FIG. 7 shows that the transducer element array 14 is driven by a delay generator 34 that generates two wavefronts 36 and 38 that are directed towards each other in directions 40 and 42. The values of delays 1-4 may be set to: delay 2=delay 3; delay 1=delay 4; delay 2>delay 1, and delay 3>delay 4 so that the wavefronts 36 and 38 are directed toward a common axis. Thus, by driving the transducer elements with different phases of the signal, the hypersonic wavefront emitted (or received) by the transducer element array 14 becomes focused as opposed to a planar wavefront that is generated by driving the transducer elements with substantially the same signal. The focused hypersonic wavefront forms a hypersonic beam that may be directed at an object which may be located anywhere relative to the transducer element array 14. The hypersonic beam may be concentrated at one location in space or expanded so that wavelets diverge from each other in a controlled manner. Thus, a focused hypersonic beam may be diverging or converging. In the following discussion, unqualified references to "focused hypersonic beam" includes both converging and diverging focused hypersonic beams that may be directed in any angle relative to a transducer element array.

Figure 8:
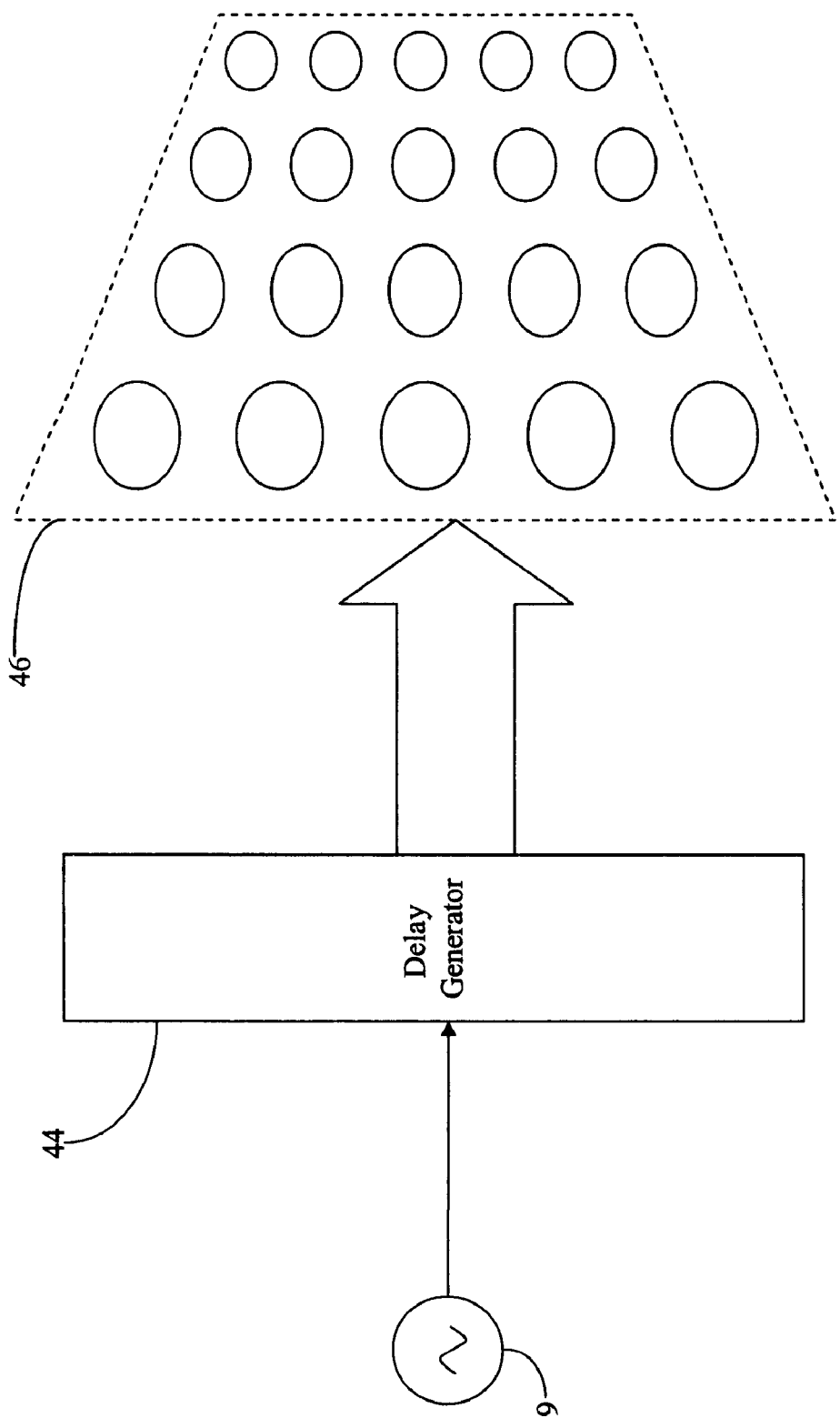
FIG. 8 shows a two-dimensional array of hypersonic transducer elements.
Figure 9:
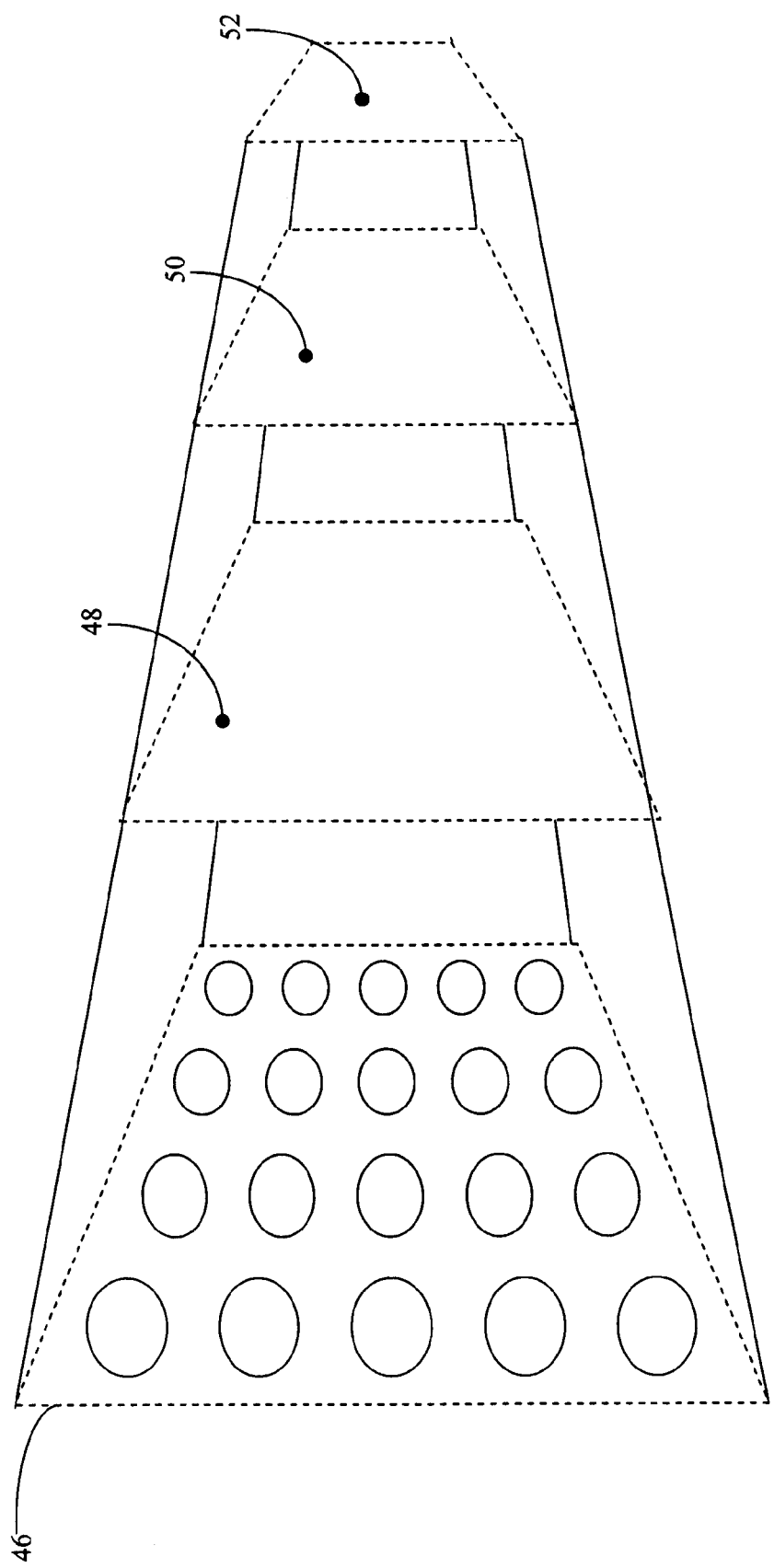
FIG. 9 shows a focused hypersonic beam generated by the hypersonic transducer elements shown in FIG. 8.

FIG. 8 shows a two-dimensional array 46 that is driven by a delay generator 44 that applies to each of the transducer elements in the transducer element array 46 delayed versions of the signal generated by the signal generator 9. The transducer elements closer to a center of the transducer element array 46 may receive signals having delays that are greater than the delays of signals driving transducer elements that are closer to the perimeter of the transducer element array 46. Thus, a focused two-dimensional wavefront may be generated as shown in FIG. 9. Here, the wavefronts 48, 50 and 52 are increasingly smaller as the distance from the transducer element array 46 increases. If the dimensions of the wavefront 52 is the smallest dimension that may be generated given the wavelength of the signal generated by the signal generator 9, then the wavefront 52 is at a focal point of the focused beam generated by the transducer element array 46 and may be referred to as a beam waist 52. For an array consisting of many transducer elements and with an array diameter D emitting hypersonic waves of wavelength λ the lateral size of the beam waist 52 at the focal point a distance L (focal distance) from the transducer element array 46 is given by Lλ/D. The focused beam diverges after the focal point when the distance from the transducer element array 46 is greater than the focal distance L.

Figure 10:
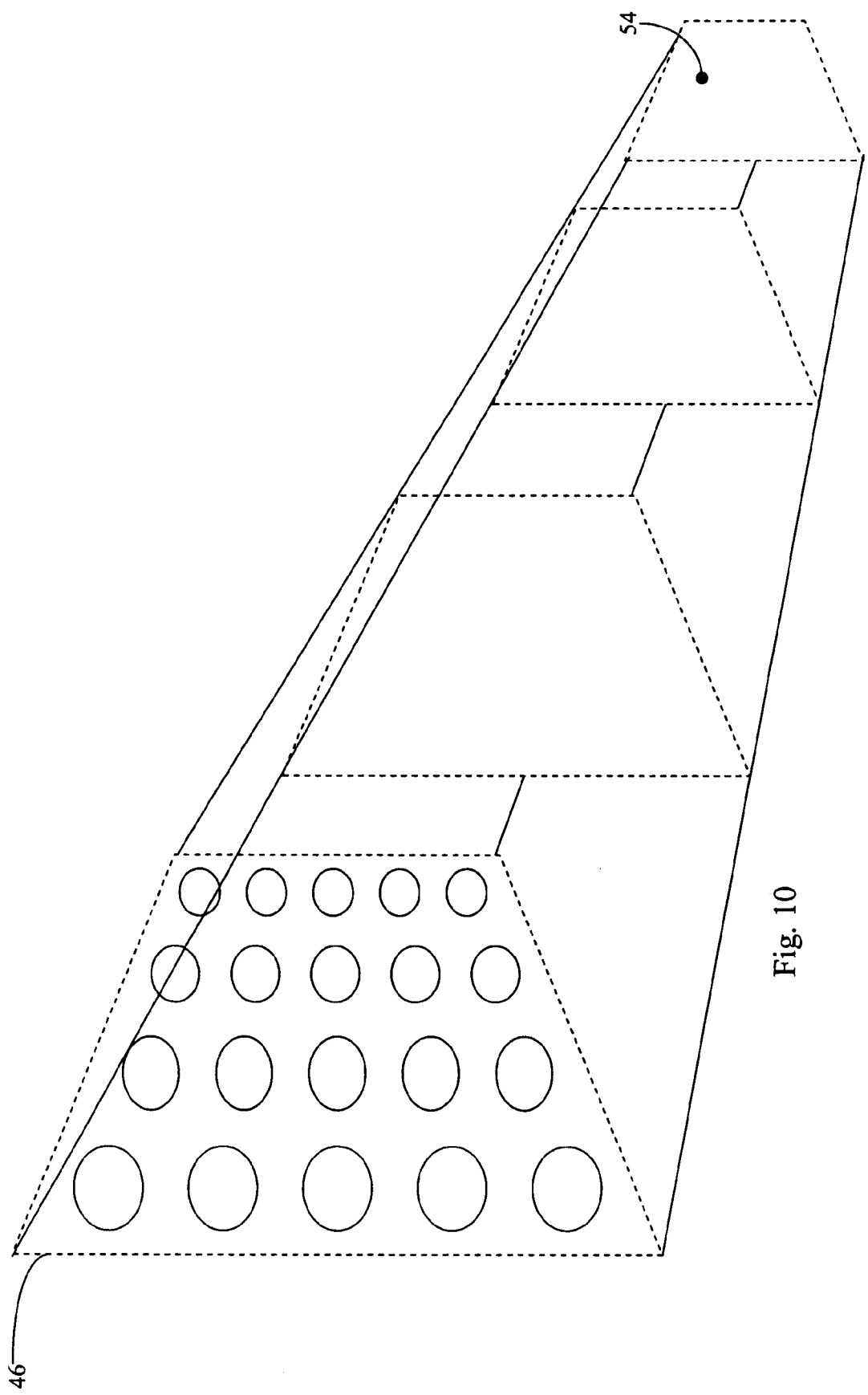
FIG. 10 shows a focused hypersonic beam directed at an arbitrary location.

FIG. 9 shows the focal point 52 directly in front of the transducer element array 46. However, the focal point may be placed anywhere in three-dimensional space by driving each of the transducer elements in the transducer element array 46 with proper delays thereby changing the focal distance L and direction angle θ. For example, in FIG. 10, a focal point 54 is placed at a location that is different than the focal point 52 shown in FIG. 9.

Figure 11:
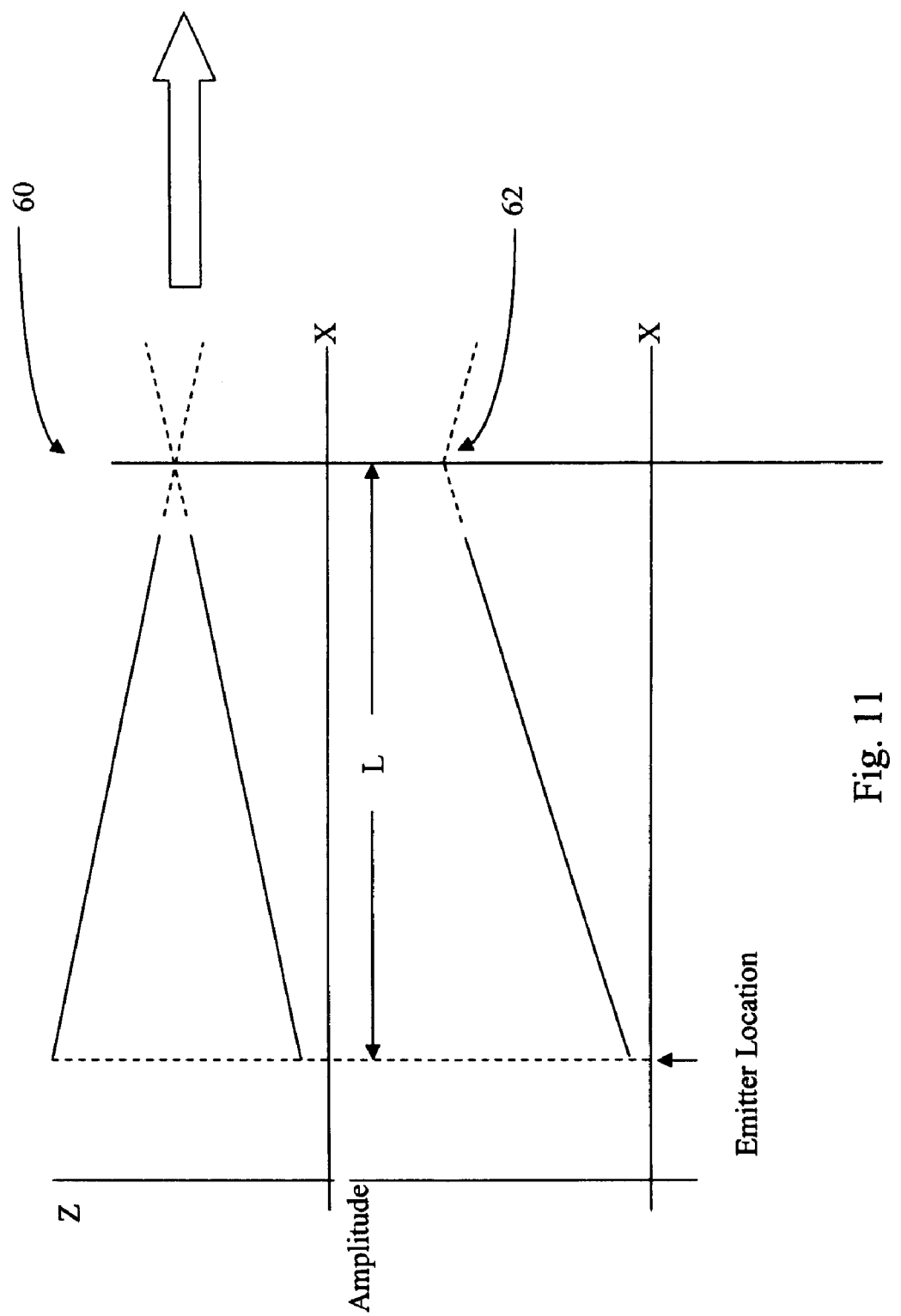
FIG. 11 shows exemplary diagrams of a spatial configuration and an amplitude variation over distance for the focused hypersonic beams of FIGS. 9 and 10.

FIG. 11 shows a representative diagram of a wavefront configuration 60 seen from the side and a signal amplitude 62 of the converging focused hypersonic beam generated by the transducer element array 46. The wavefront configuration 60 narrows as the distance from the transducer element location increases. This narrowing effect is caused by the focused nature of the beam formed by the transducer element array 46. As noted above, the wavefront configuration 60 diverges after the focal distance L is reached. The amplitude 62 of the signal increases with the distance from the transducer element array 46 until the focal distance L is reached; then the amplitude 62 decreases. The increase is caused by a concentration of the energy transmitted by the transducer element array 46 also due to the converging focused nature of the beam. Thus, neglecting the effects of absorption, the transmitted signal is at its highest intensity at the focal point of the transmitted beam.

In view of the above, for transmission mediums such as air that have an increasing non-linear response with increasing signal amplitude, an amount of hypersonic energy converted to audio energy may be controlled by controlling an intensity of a focused beam in the beam direction. Thus, by controlling amplitudes and phases (delays) of hypersonic signals emitted by a phased hypersonic transducer element array, a size or volume of a neighborhood of audio energy may be controllably beamed to and positioned in any location in three-dimensional space by an transducer element array such as the transducer element array 46 discussed above. While the above discusses forming focused hypersonic beams using hypersonic transducer element arrays having transducer elements that are disposed in fixed positions relative to each other, the distances between transducer elements can be fixed or varied as long as the appropriate phases are used to create the desired wavefronts for focused hypersonic beams.

Figure 12:
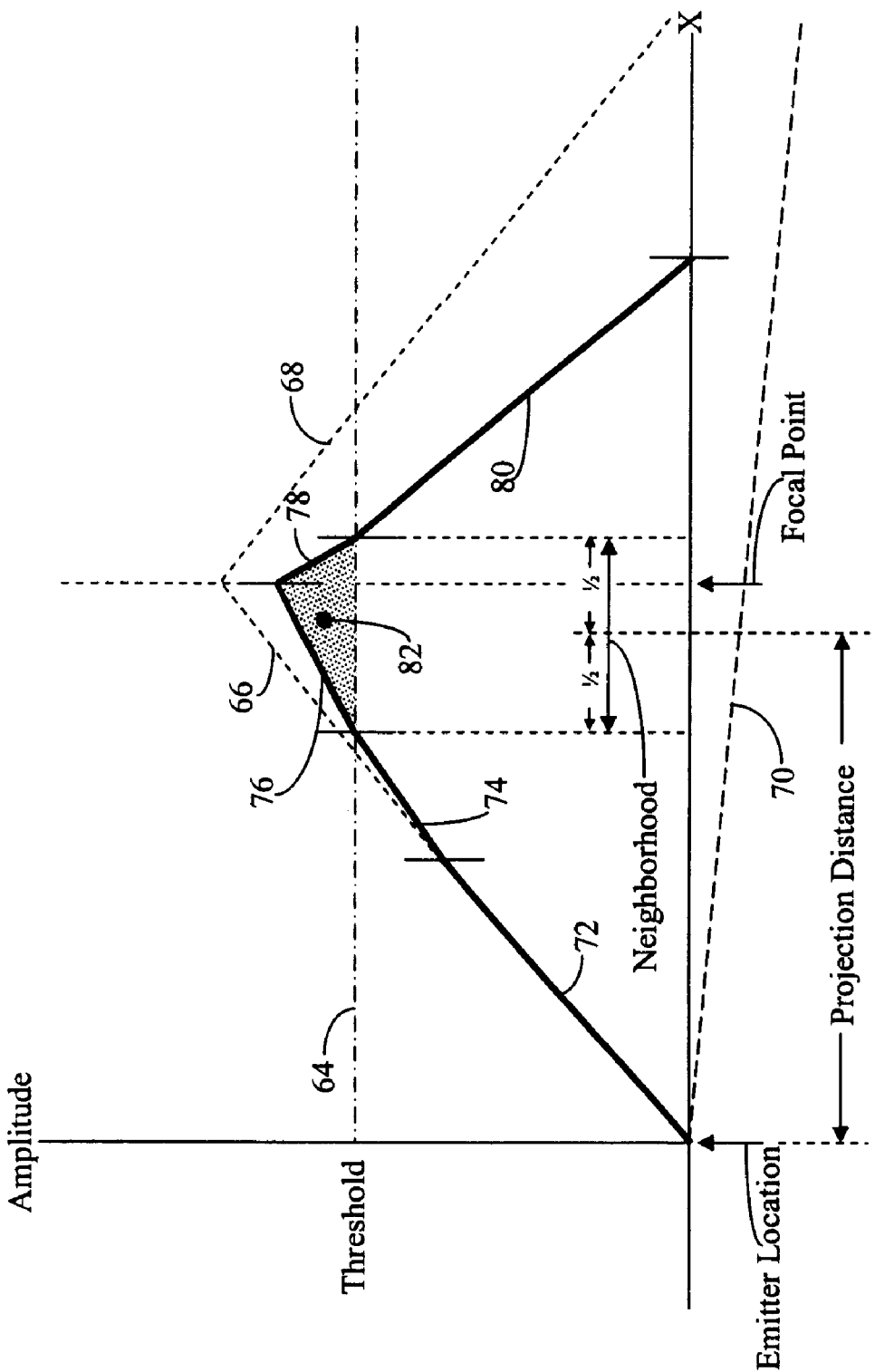
FIG. 12 is an exemplary diagram of amplitude variation over distance from a transducer elements for a focused hypersonic beam.

FIG. 12 shows an intuitive graphical representation of a neighborhood projected by a focused hypersonic beam. The transducer element location is shown at the intersection between the amplitude and x-axes where x is the distance away from the transducer element. The threshold is represented by a dashed line 64. Dashed lines 66 and 68 represent idealized hypersonic beam amplitude profile without consideration of losses such as conversion of hypersonic energy into audio energy or other energy dissipating effects such as absorption and dispersion. Thus, the amplitude of a converging focused hypersonic beam increases (represented by a linear line even though actual amplitude increase may be other than linear) up to a focal point, and then decreases until the amplitude reaches zero as represented by the dashed line 68. The bold line that includes line segments 72-80 represents an amplitude of the focused hypersonic beam.

Line segment 72 represents small signal transmission where air (or other similar medium) is basically linear. The absorption and dispersion effects represented by dash line 70 (represented as linear) merely decrease the slope of the line segment 72. Line segment 74 represents a small but noticeable decrease in the amplitude of the hypersonic beam due to slight conversion of hypersonic energy into audio energy. However, as noted above, this slight conversion into audio energy is not detectable because the amplitude of the hypersonic beam is below the threshold as indicated by the dashed line 64.

Line segment 76 and 78 show the amplitude above the threshold dashed line 64. Here, the hypersonic energy to audio energy conversion results in perceptible audible sound. Thus, the amplitude of the hypersonic beam is significantly decreased because a large amount of hypersonic energy is converted into audio energy. An area 82 bounded by line segments 76 and 78 and the threshold dashed line 64 is a region in which audio information may be said to be delivered. The distance between the crossover points where the amplitude of the hypersonic beam intersects the threshold dashed line 64 is the extent of the neighborhood in which the audio information is delivered. The amplitude of the audio signal increases until the focal point and then decreases rapidly until the amplitude of the hypersonic beam decreases below the threshold dashed line 64. The projected audio frequency energy diverges and attenuates with increasing distance away from the projected neighborhood.

Line segment 80 shows the amplitude of the converging focused hypersonic beam decreasing until the amplitude reaches zero. The slope of the line segment 80 is more negative than the slope of the dash line 68 because absorption and dispersion effects as represented by the dashed line 70 further reduce the amplitude of the converging focused hypersonic beam beyond the amplitude reduction due to the focusing effect of the converging focused hypersonic beam.

While FIG. 12 only shows the neighborhood boundaries along the x-axis, the converging focused hypersonic beam extends in all three dimensions so that a volume is formed within which the hypersonic signal transmitted by the hypersonic beam is converted into an audible signal. The distance of the neighborhood from the transducer element location is a projection distance. The projection distance may be measured from the transducer element location to a center of the neighborhood volume in the x-direction.

Figure 13:
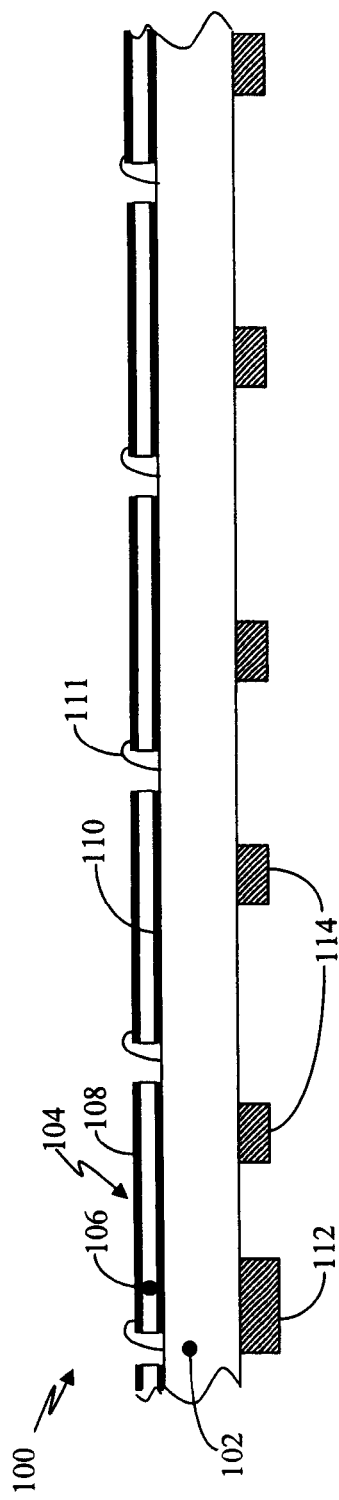
FIG. 13 shows a first exemplary ferroelectric transducer element array.

FIG. 13 shows an transducer element array 100 that includes a substrate 102 having a plurality of transducer elements 104 formed on a first surface, and electronic components such as a controller 112, and delay units 114 formed on an opposite second surface. The substrate 102 may include ordinary printed circuit board materials such as FR4 or ceramic that are dimensioned for optimal transmission of selected hypersonic frequencies, such as resonance properties or impedance mismatch and absorption properties, for example. Each of the transducer elements 104 includes a piezoelectric or ferroelectric material 106 such as lead zirconate titanate (PZT) or polyvinylidene diflouride (PVDF or PVF2), and two electrodes 108 and 110 formed on a top and a bottom surface of the ferroelectric/piezoelectric material 106. The bottom electrode 110 is connected to components such as a controller 112 and delay generator 114, for example, via wire patterns formed on the first surface inter-connected to wire patterns found on the second surface using well known methods such as via holes and metal traces, for example. Intermediate layers may also be used if wiring density requires multiple layers. The top electrodes 108 may be connected to patterns formed on the first surface via wires 111 using wire bonding techniques, for example. Alternatively, the common electrodes 108 can be conductively bonded to metallized polyester sheet, such as aluminized Mylar, with the metal conductively connected to the electronic traces and selected points, e.g. at the periphery of the array.

As is well known, ferroelectric/piezoelectric materials change physical shape when an electric potential is applied to opposite surfaces. Thus, when an electric potential is applied between the electrodes 108 and 110, the ferroelectric/piezoelectric material 106 changes its physical shape, such as its thickness. When signals are applied between the electrodes 108 and 110, each of the transducer elements 104 moves up and down creating pressure waves on its top surface. The pressure waves propagate outwardly transmitting the energy into the transmission medium such as air. If the signal driving the transducer elements 104 is at hypersonic frequencies, then a hypersonic signal is transmitted in the air.

Figure 14:
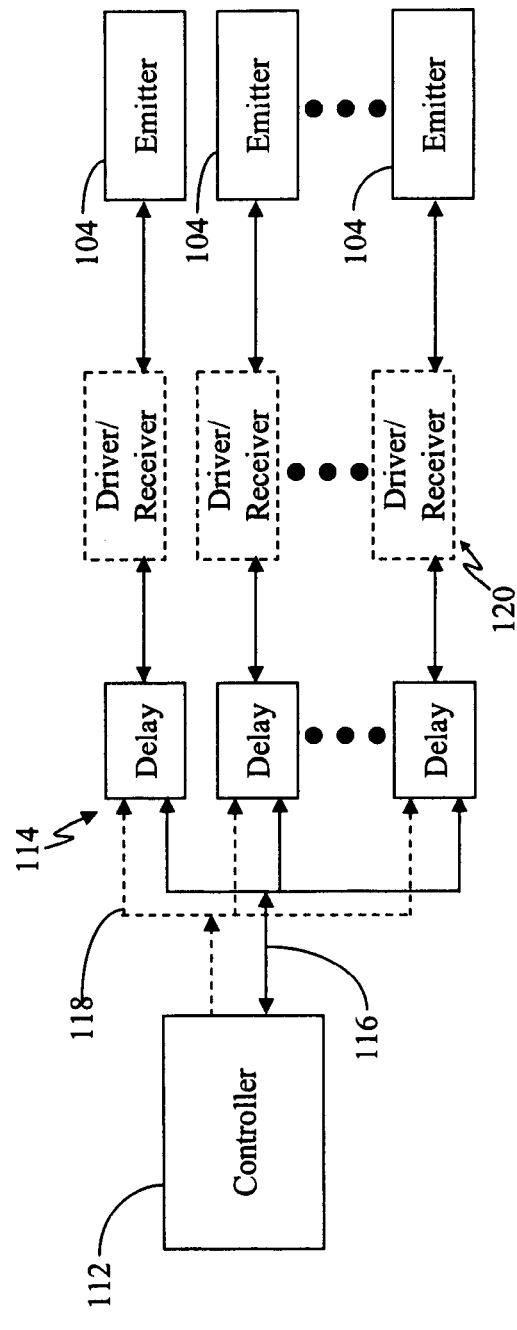
FIG. 14 shows an exemplary block diagram of a system for driving a phased array of hypersonic transducer elements.

As shown in FIG. 14, the electrodes 108 and 110 of each of the transducer elements 104 may be connected to corresponding delay generators 114 via driver/receivers 120. The delay generators 114 receive signals from the controller 112, for example. Thus, the controller 112 may act as a signal generator outputting a signal to be transmitted by the transducer elements 104. Each of the delay generators 114 delays the received signal by a delay value so that each of the transducer elements 104 may generate a pressure wave in a phase relationship that is controlled by the controller 112.

The transducer element array 100 may also be used as a hypersonic signal receiver. As shown in FIG. 14, the arrows between the transducer elements 104 and the driver/receivers 120, between the delay generators 114 and the driver/receivers 120, and between the delay generators 114 and the controller 112 are bi-directional. In the receive mode, the delays generated by the delay generators 114 delay hypersonic signals received by the respective transducer elements 104. Thus, a "receive" focused hypersonic beam is formed so that only hypersonic signals defined by the focused hypersonic beam are received. The wavefront configuration and the focal distance is substantially the same as that of a transmitted focused hypersonic beam. This "reciprocal" relationship between transmitted and received focused hypersonic beams holds for all transducer element arrays.

The ferroelectric/piezoelectric transducer elements change physical dimensions when an electric signal is applied to their electrodes, and when pressure waves are applied to the transducer elements, the ferroelectric/piezoelectric materials of the transducer elements generate an electric potential across their electrodes. These electric potentials may be delayed and amplified (the signals may be first pre-amplified to reduce noise that may be introduced by the delay generators) before forwarding to the controller 112 to form the focused hypersonic beam. If the delay generator functions are performed by the controller 112, then the controller 112 may use all the signals received by the transducer elements 104 to form any needed focused hypersonic beam, because the controller 112 may apply any set of delays required.

The controller 112 may be a digital signal processor (DSP) that sends control signals via a control line 118 to the delay generators 114. Each of the delay generators 114 may receive a specific delay parameter that corresponds to an appropriate phase shift that should be applied to the signal to be transmitted. After the delay generators 114 have been initialized, the controller 112 may output a signal on a signal line 116 to the delay generators 114. The delay generators 114 appropriately delay the signal and output the delayed signals to the driver/receivers 120 which convert the delayed signals into appropriate signal properties for driving the transducer elements 104 such as amplifying the signal voltage to 300 volt, for example. The 300 volt signals drive the transducer elements 104 for transmission of hypersonic signals into the transmission medium, such as air. The driver/receivers 120 can be silicon chips or can be amorphous silicon or polysilicon high voltage transistor amplifiers on glass or plastic along with polysilicon amplifiers for the received low level signals.

The control line 118 and the delay generators 114 are shown as dash lines because these elements may not be necessary if the appropriate delay is generated within the controller 112. The controller 112 may generate multiple signals phase-shifted from each other and outputs the phase-shifted signals to the driver/receivers 120 for directly driving the appropriate transducer elements 104. For example, transducer elements 104 that are located a same distance from a center of the transducer element array 46 may receive a signal delayed by the same amount. Thus, the controller 112 is not required to generate the same number of signals as there are transducer elements 104. Instead, the controller 112 may be required only to generate a number of unique signals that are delayed from each other that is needed to focus a hypersonic beam. The connections between the drivers 120 and the controller 112 may be configured in groups so that drivers of transducer elements that receive a same phase-shift signal are grouped together and driven by the controller 112 using a single signal line. In this way, the controller 112 only outputs unique delayed signals that are required to focus the hypersonic beam. Additionally, multiple controllers can be used. For example, there could be one DSP associated with each driver/receiver.

The delay generators 114 may be implemented using delay lines, for example. If the hypersonic beam is to be focused at a fixed location, then the delay lines may be set to fixed values (e.g., for a megaphone) and need not receive parameters from the controller 112 via the control line 118. In such a case, the delay lines are components that are mounted on the substrate 102, and always delay the signal by a fixed amount before outputting to the transducer elements 104.

Various technologies may be used to construct the delay generators 114 to provide programmability. For example, micro-electro-mechanical systems (MEMS) may be used to implement a programmable delay unit 114. Using such a technology, capacitors may be formed with electrodes that are movable with respect to one another to change its capacitance values. Thus, a delay line constructed of inductors and such capacitors may be formed so that the controller 112 may send a command to set the various capacitors to different positions to achieve different delays.

The delay generators 114 may also be implemented using digital delay techniques, for example. Hypersonic signals have frequencies greater than 20 kHz, such as 100 kHz, for example. Electronic logic devices may operate at mega or giga Hertz clock rates. Thus, the controller 112 may send 100 kHz signal data in digital packets with a delay parameter in a header, for example, to the delay generators 114 which then outputs the 100 kHz data at an appropriate delay based on down counters that may be loaded with delay values from the header information, for example. The output of the delay generators may be filtered into analog signals and output at appropriate voltages to the transducer elements 104. Using digital techniques, such as described above, the driver/receivers 120 may be used as output stages of the delay generator 114, and 100 kHz data signals may be received by the delay generators 114 directly from the controller 112 via the signal line 116.

Figure 15:
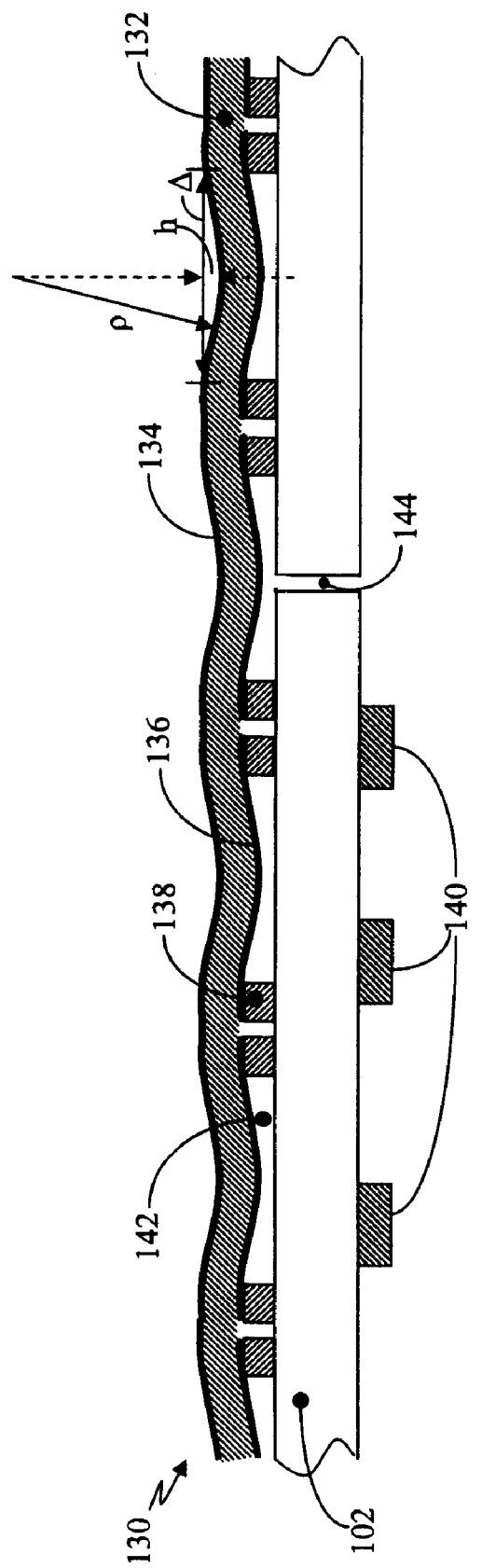
FIG. 15 shows a second exemplary ferroelectric transducer element array.

FIG. 15 shows a hypersonic transducer element array 130 that includes a thick film material 132 (e.g., ferroelectric/piezoelectric material) mounted above a first surface of the substrate 102 via conductive adhesive standoffs 138. A common electrode 134 is formed on a top surface of the thick film material 132, and a plurality of electrodes 136 corresponding to transducer elements 131 is formed on a bottom surface of the thick film material 132 between conductive adhesive standoffs 138. The plurality of electrodes 136 are not directly connected to each other, but are connected via the conductive adhesive standoffs 138 to first wire patterns formed on the first surface of the substrate 102, which are in turn connected to electronic components 140 via second wire patterns formed on a second surface of the substrate 102. The common electrode 134 may be connected to a fixed potential conductor such as ground, for example.

Each of the transducer elements 131 may be formed with a concave (or convex) surface. The concaveness (or convexness) predetermines a direction that the thick film material 132 will bend when, say, the thick film material 132 contracts in thickness and therefore expands laterally in width. If no preference is provided, some transducer elements would move outwardly while some inwardly generating hypersonic wavelets that are 180 degrees out of phase with each other, which is normally undesirable.

If the concave (or convex) surface is spherical and the radius of the sphere is $\rho$, the diameter $\Delta$ (approximately a distance between cross-sections the conductive adhesive standoff 138 for each transducer element), then a height h of the concavity (or convexity) of each transducer element 131 may have a relationship of:

$$h \sim \Delta^2/8\rho.$$

For $\Delta \sim 1$ millimeter (mm) and $\rho \sim 1$ centimeter (cm), then $h \sim 12$ $\mu$m. $\Delta$ may have a value of approximately $\lambda/4$ where $\lambda$ is the wavelength of the transmitted hypersonic beam. The speed of sound in air at standard temperature and pressure (STP) is about 330 m/sec. Thus, For $\Delta \sim 1$ mm, the transducer elements 131 would be suitable to transmit a hypersonic beam having a frequency of 80 kHz which has a $\lambda/4$ of about 1 mm.

Figure 16:
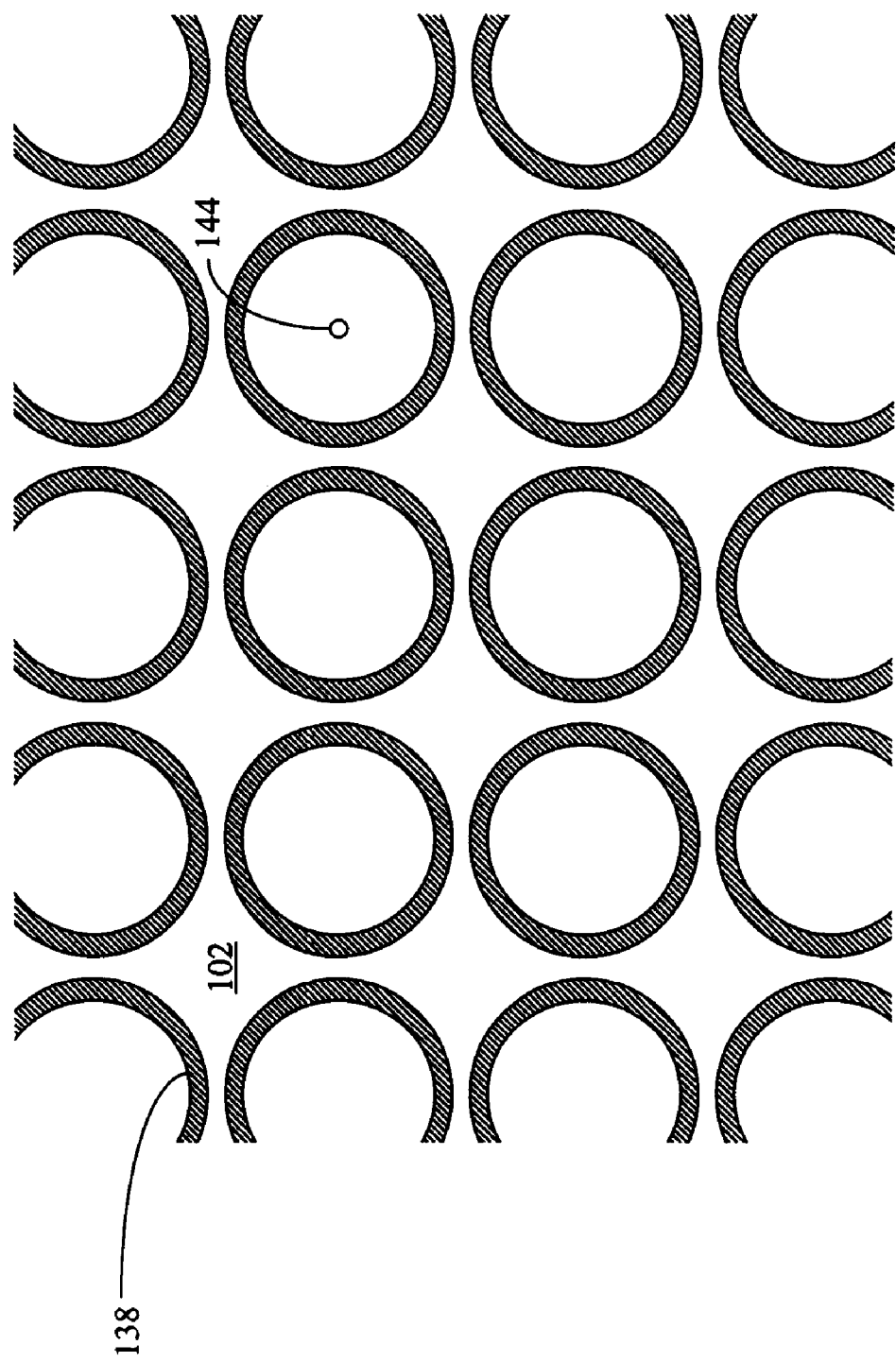
FIG. 16 shows an exemplary adhesive standoff configuration.

FIG. 16 shows a plan view of the transducer element array 130 showing only the conductive adhesive standoffs 138 mounted on the substrate 102. As shown, the conductive adhesive standoffs 138 may form closed perimeter shapes such as circular shapes forming an enclosed volume when the thick film material 132 and electrodes 134 and 136 are placed over the conductive adhesive standoffs 138. The closed perimeter shapes may have any other shapes such as triangles, hexagons, or squares or irregular shapes, for example. Each of the circular patterns formed by the conductive adhesive standoffs 138 corresponds to one of the transducer elements 131. Thus, the electrodes 136 may also have a shape corresponding to the closed perimeter and placed over the conductive adhesive standoffs 138 to form a space 142 between the electrodes 136, the conductive adhesive standoffs 138 and the substrate 102.

A hole 144 may be formed in the substrate 102 within the area encircled by each of the adhesive standoffs 138. Such a hole is also shown in FIG. 15 traversing the thickness of the substrate 102. The hole 144 may be a via, for example, that may be formed using standard printed circuit board processes. The hole may serve to relieve back pressure in the spaces 142 when each of the transducer elements 131 are vibrating at hypersonic frequencies. If it is desirable to set a pressure in the spaces 142 to a specific value (other than an ambient pressure) such as a vacuum in the spaces 142, the hole 144 may be used as a suction hole and then filled with material such as solder after the vacuum is formed. If it is desirable to pressurize the spaces 142 to above the ambient pressure, the hole 144 may be used as a fill hole and then sealed with material such as solder after the pressure is established. Pressure in the spaces 142 may be established by other methods such as assembling the transducer element array 130 in a pressurized environment, for example. Further, the spaces 142 may be filled with other materials such as foam so that desirable hypersonic transducer element characteristics may be obtained.

Figure 17:
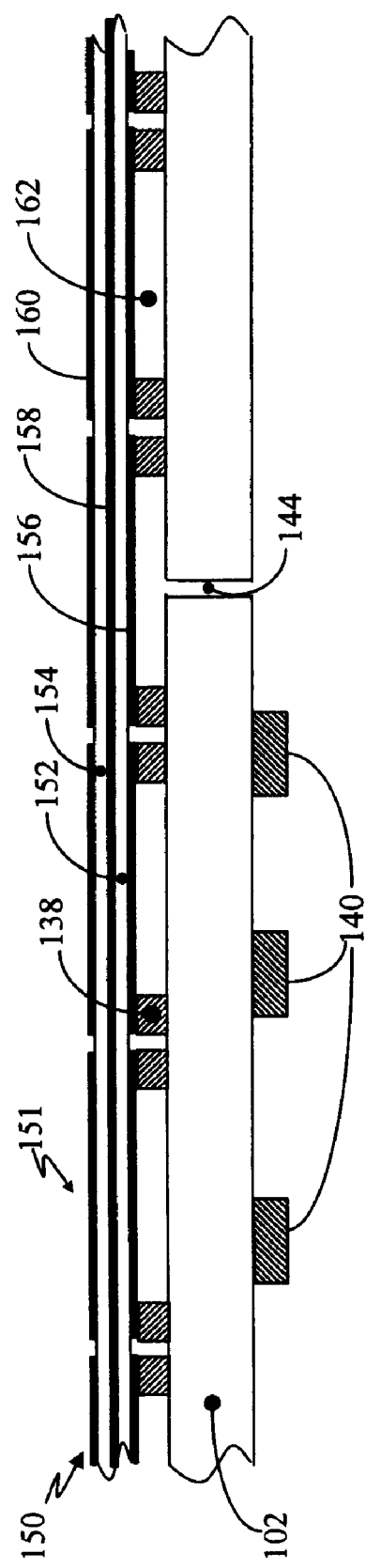
FIG. 17 shows an exemplary bimorph ferroelectric transducer element array.

FIG. 17 shows a bimorph hypersonic transducer element array 150 that includes two layers of thick films 152 and 154 made of ferroelectric/piezoelectric materials and three sets of electrodes 156, 158 and 160 mounted on the conductive adhesive standoffs 138 over the first surface of the substrate 102. The electrodes 156 are not directly connected to each other but are connected to the wiring patterns on the first surface of the substrate 102 via the conductive adhesive standoffs 138. The electrodes 160 are not directly connected to each other, but may be connected to the first surface of the substrate 102 via wiring patterns on the top surface of the thick film 154 as shown in FIG. 18, for example.

Figure 18:
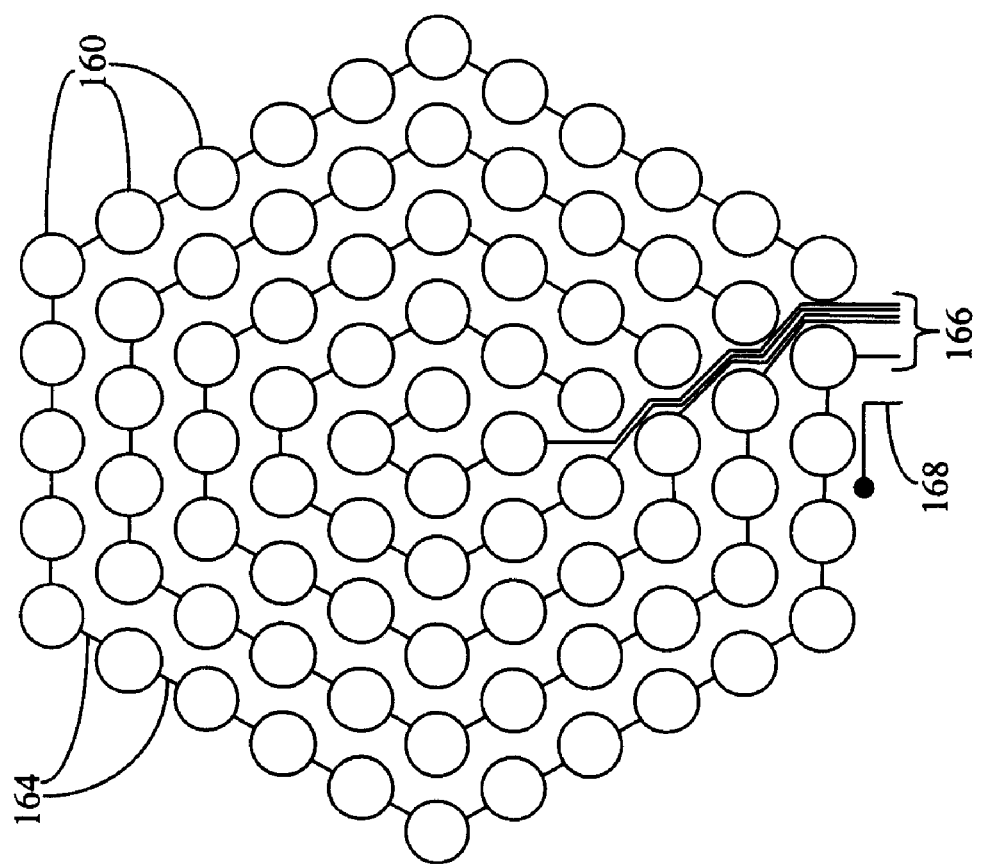
FIG. 18 shows an exemplary plan view of electrodes for the bimorph ferroelectric transducer element array of FIG. 17.

In FIG. 18, the electrodes 160 have circular shapes, for example, (as noted above, other shapes may be possible) and are interconnected by wiring patterns 164. All the electrodes 160 corresponding to transducer elements 151 that are driven by a same phase of the hypersonic signal are connected together as a group by the wiring patterns 164. Each group is connected to a perimeter of the thick film 154 to form an input port 166 together with an input port 168 corresponding to the common electrode 158. These input ports may be connected to the first or second surface of the substrate 102 either via wiring patterns or by folding of the thick films 152 and 154 around an edge to make contact with the first or second surface of the substrate 102. In a similar fashion each electrode 160 can be connected to and driven individually.

Returning to FIG. 17, spaces 162 bounded by the conductive adhesive standoffs 138, the electrodes 156 and the first surface of the substrate 102 maybe be vented to the outside via the hole 144, pulled into a vacuum using the hole 144 and filling the hole with solder or be filled with foam similar to that discussed above. The electrodes 156 and 160 are connected to components 140 mounted on the second surface of the substrate 102 so that each of the electrodes 156 and 160 are properly driven with appropriate phases from the components 140 which may include controllers, digital signal processors, delay generators, etc.

The transducer elements 151 of the hypersonic transducer element array 150 do not require concave surface shapes because a direction of movement of each of the transducer elements may be controlled by applying proper signals to the electrodes 156 and 160. To force the transducer elements 151 to move outwardly, the thick film 154 should be made to expand while the thick film 152 should be made to contract. To bend each of the transducer elements 151 inwardly toward the substrate 102, the thick film 152 should be made to expand while the thick film 154 should be made to contract. The same effect may be obtained (but with less force) if one of the thick films 152, 154 (preferably the thick film 154 to obviate the need for complex contact routing) is not activated at all while the other thick film 152, 154 is made to expand or contract. If activating only one thick film is desired, then only one of the thick films 152 and 154 need to be ferroelectric/piezoelectric while the other one of the films may be made of a flexible material that tends to maintain its lateral dimension. In this case, electrodes 160 are not required.

Figure 19:
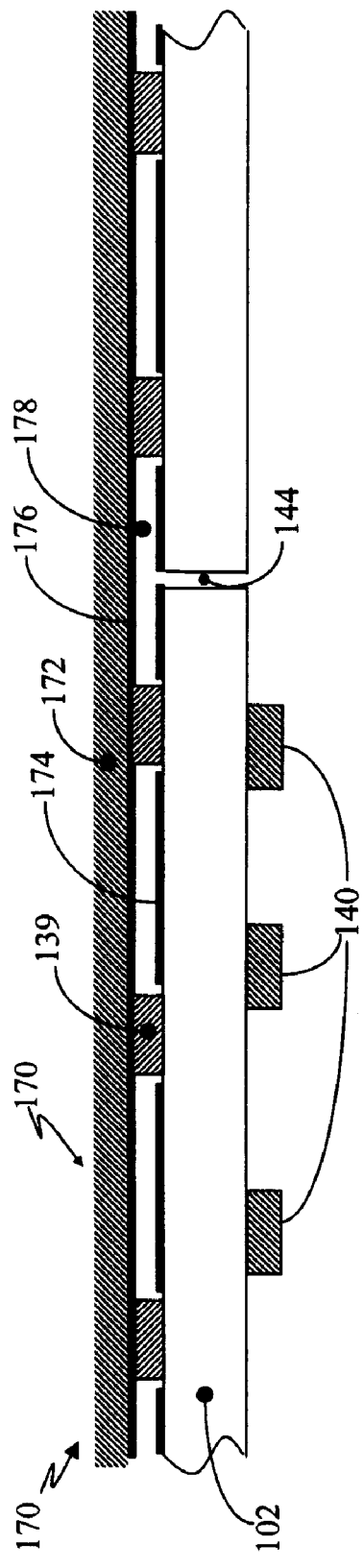
FIG. 19 shows a first exemplary non-ferroelectric hypersonic transducer element array.
Figure 20:
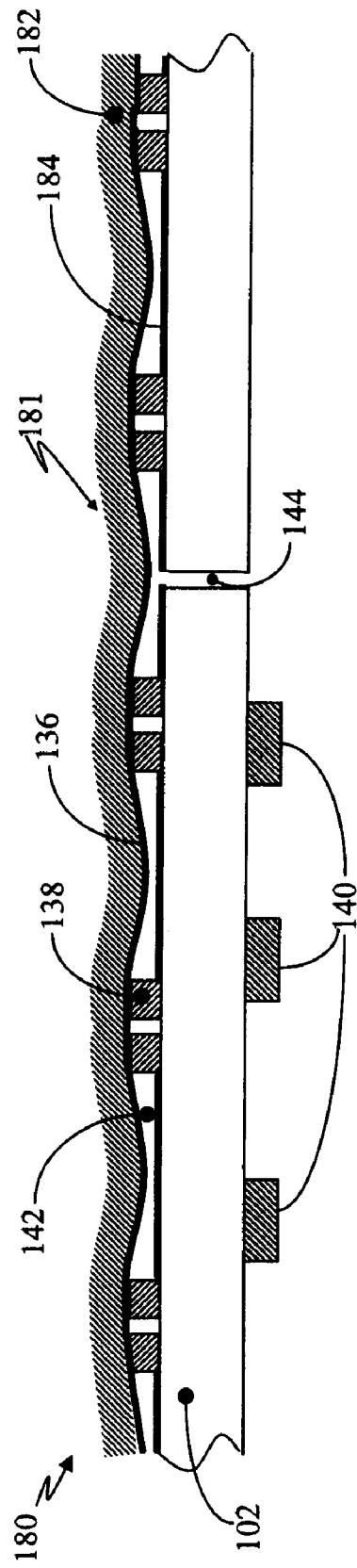
FIG. 20 shows a second exemplary non-ferroelectric hypersonic transducer element array.

FIGS. 19 and 20 show two hypersonic transducer element arrays 170 and 180 that operate based on capacitive principles. In FIG. 19, a thick film 172 (plastic sheet or metallized polyester, for example) includes a metal film 176 that is deposited or bonded on a bottom surface of the thick film 172. The metal film side of the thick film 172 is adhered to the first surface of the substrate 102 via conductive adhesive standoffs 138 as discussed above in connection with other hypersonic transducer element arrays. The conductive adhesives standoffs 138 are connected to patterns formed on the first surface of the substrate 102 and connected to components 140 coupled to the second surface of the substrate 102 via wiring patterns. As discussed above, the connections between wiring patterns formed on the first surface of the substrate 102 and the second surface of the substrate 102 may be performed using standard techniques such as via holes.

Electrodes 174 are formed on the first surface of the substrate 102 so that the electrodes 174 and the common electrode 176 form capacitors. The electrodes 174 are not directly connected to each other. When the common electrode 176 and the electrodes 174 are charged with opposite charges, an attractive force is developed between the common electrode 176 and the electrodes 174 so that the thick film 172 and the common electrode 176 are caused to move toward the electrode 174. When the charges between the electrodes 174 and 176 are removed, the thick film 172 and the common electrode 176 return to and past their flat condition, thus generating an oscillatory pressure wave in the air surrounding each of the transducer elements 171.

If, instead of applying opposite charges between the electrodes 174 and the common electrode 176, the same charges are applied, a repelling force is generated that tends to force the thick film 172 and the electrode 176 away from the first surface of the substrate 102 thus causing the thick film 172 and the common electrode 176 to move outwardly in a "convex" manner. When the charges are removed, the thick film and the common electrode 176 may relax and return to their original positions. Opposite charges and same charges may be applied alternatively to the electrodes 174 and common electrode 176. This would force the thick film 172 and the common electrode 176 to flex outwardly and then inwardly.

In a similar manner, fixed charges may be embedded within the surface regions of a material to create static fields. The thick film 172 and/or the first surface of the substrate 102 may be so pretreated so that a field is created without any signal applied to the electrodes 174 and 176. In such a case, the thick film 172 and the common electrode 176 will be pulled toward the first surface of the substrate 102 in a concave manner without any signals applied between the electrodes 174 and 176. The signals when applied to the electrodes 174 and 176 would tend to neutralize the pre-embedded attractive forces and thus cause the thick film 172 to move outwardly generating a pressure wave in the surrounding air. The opposite effect may be achieved by pre-embedding the same type of charges on the electrodes 174 and 176 and neutralizing the pre-embedded charges with a signal.

FIG. 20 shows a hypersonic transducer element array 180 having the thick film 182 and the common electrode 136 preformed into concave shapes so that a distance between the common electrode 136 and the electrodes 184 are closer to each other. In this way, stronger attractive forces may be generated by applying signals between the common electrode 136 and the electrodes 184. As before, the spaces 178 and 142 of the hypersonic transducer element arrays 170 and 180 may be vented using via holes 144, have gases in the spaces 178 or 142 set to a desirable pressure (e.g., either vacuum or overpressure) through the holes 144 or be foam filled to generate appropriate characteristics for each of the transducer elements 171 and 181.

Figure 21:
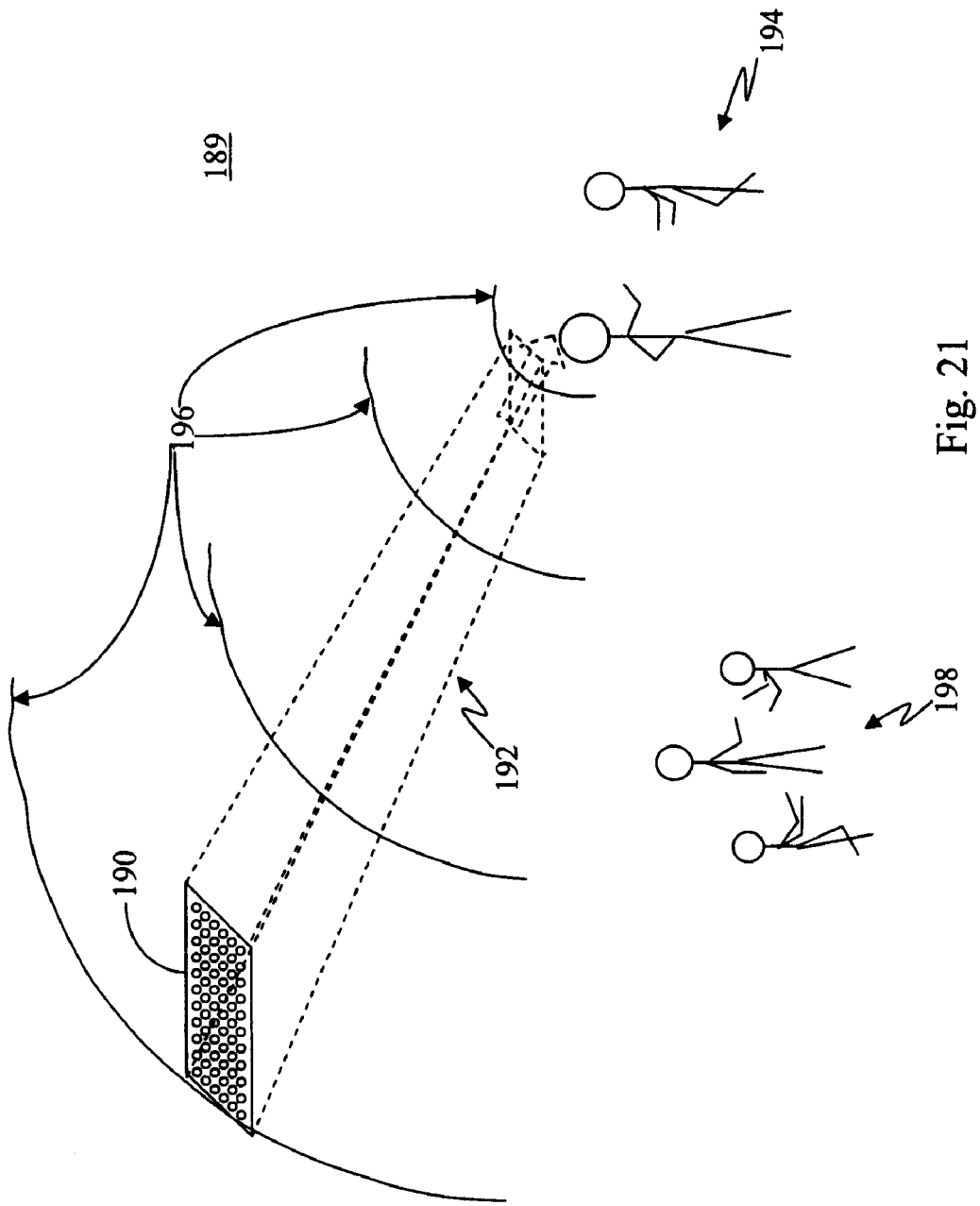
FIG. 21 shows a hypersonic transducer element array used to ping a specified space by scanning the space using a focused hypersonic beam.

FIG. 21 shows an example of how a focused hypersonic beam may be used to communicate audio information in a space 189. A hypersonic transducer element array 190 is used both to determine objects in the space 189 as well as to transmit audio information to detected objects within the space 189. In a "ping" mode, the hypersonic transducer element array 190 may be used to scan the space 189 in depth and angle to identify groups of people 194 and/or 198, for example. The space 189 may be a large conference room, a supermarket, or a gathering in the open air. A focused hypersonic beam 192 may be used to scan the space 189 in a regular manner similar to raster scan of a display screen, for example.

When the focused hypersonic beam 192 is directed at the people group 194, reflection waves 196 are reflected back to the hypersonic transducer element array 190. The reflected waves 196 may be received by the hypersonic transducer element array 190 used as a receiver to detect presence of the people group 194. After the complete space 189 is scanned, the location of people groups 194 and 198 may be stored in a memory together with identification information if such information is available.

For example, the hypersonic scanning system may be used in conjunction with a video display where an operator may visually identify the people groups 194 and 198 and enter identification information to be stored with the location information determined by using the hypersonic transducer element array 190. Other methods of identifying object may also be used in conjunction with the hypersonic transducer element array 190 such as an operator using a joystick with crosshairs on a video screen identifying specific persons that may be recognized so that audio information may be delivered to such persons. In such cases, the hypersonic scanning system may be used to confirm the existence of identified objects or used only to deliver audio information. Additionally, the hypersonic transducer element array 190 may be used to continuously track movements of identified objects such as people groups 194 and 198. For this purpose, the hypersonic transducer element array 190 may be used periodically in a ping mode and, when desired, be used to communicate audio information to various identified objects.

When communication with the detected people groups 194, 198 is desired, only the phases of the individual transducer elements which correspond a maximum return strength echo need be known. Those same phases can then be used to communicate with the detected object (i.e., people groups 194, 198). Thus, even if the parameters of the air which determine the focused hypersonic beam to the detected object at a given distance are unknown (thus, the actual distance is not known), the phase settings for detection and transmission are common. Thus variations in the transmitting medium can be ignored due to "common mode rejection" between detection and transmission modes.

Figure 22:
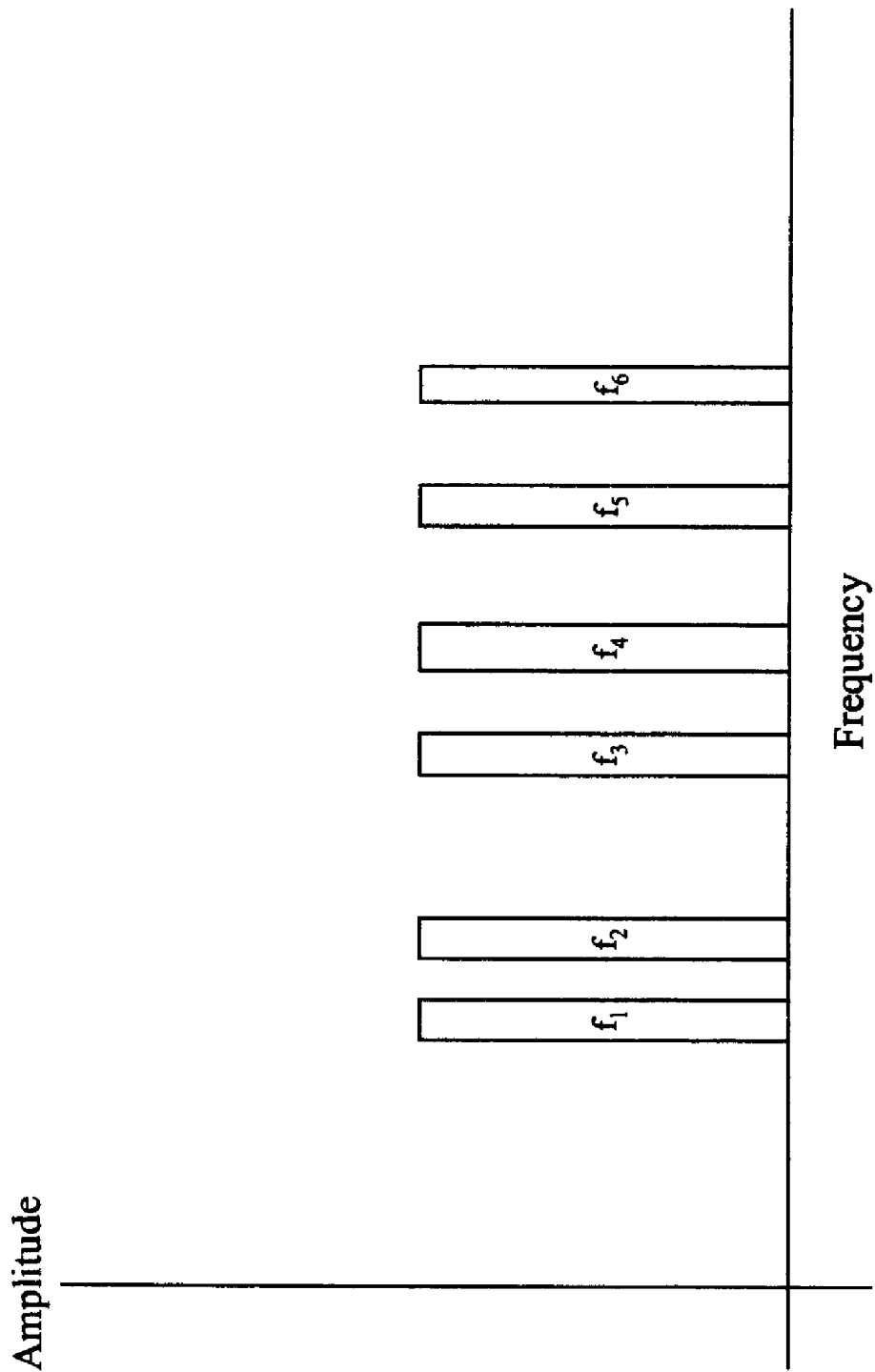
FIG. 22 shows frequency shift keying of hypersonic signals that may be used to ping a space.

FIG. 22 shows possible hypersonic signals that may be transmitted for a pinging operation. While a single frequency hypersonic signal may be used so that echoes of the transmitted hypersonic signal may be detected to determine the presence of objects, it may be difficult to distinguish the received hypersonic signal from noise signals or pinging operations performed by other hypersonic transducer element arrays that may be in operation in the same area. Thus, multiple frequency hypersonic signals or chirped signals may be used and transmitted at the same time to improve signal-to-noise ratio.

If the hypersonic signals have frequencies $f_1$-$f_6$ with amplitudes that are below the threshold, for example, then these frequencies should also be received when objects are detected. Amplitudes above the threshold may be used, but non-linear response of air must be taken into account. Further improvements of signal to noise ratios may be to encode an amplitude pattern over the frequencies $f_1$-$f_6$ so that the received reflections may also have a similar amplitude patterns to further improve signal to noise ratio and detectability.

Instead of transmitting a focused hypersonic beam for pinging, the space may be periodically illuminated by hypersonic energy much like a flood light directed away from the hypersonic transducer element array 190. (This flood light effect may be achieved by a diverging focused hypersonic beam, for example.) Then, the hypersonic transducer element array 190 may collect all the reflected hypersonic signals (echoes) which may be processed by a controller such as the controller 112, for example, to form focused hypersonic beams for detecting presence of objects.

Returning to FIG. 21, when the people group 194 is detected and audio information is desired to be communicated to this people group 194, a projection distance may be determined that places the people group 194 within a neighborhood where audio information may be heard by the people group 194. As discussed earlier, the projection distance may be determined based on parameters such as a threshold, beam focus, absorption or dispersion so that a size of the neighborhood and the projection distance may be accurately determined. In addition, possible hypersonic frequencies to encode the desired audio information may be selected based on the noise environment (i.e., hypersonic frequency and audio noise) so that a volume of delivered audio information may be determined. After all of the required parameters discussed above are determined, the desired audio information is encoded using a hypersonic frequency carrier and a single side band, for example, so that audio frequencies for communication of the audio information may be generated by the non-linear response of air. After the hypersonic signals have been generated, the hypersonic transducer element array 190 may be used to focus a hypersonic beam so that the people group 194 is within a neighborhood where the beamed hypersonic signal may be converted into audio signals, thus delivering the audio information.

Figure 23:
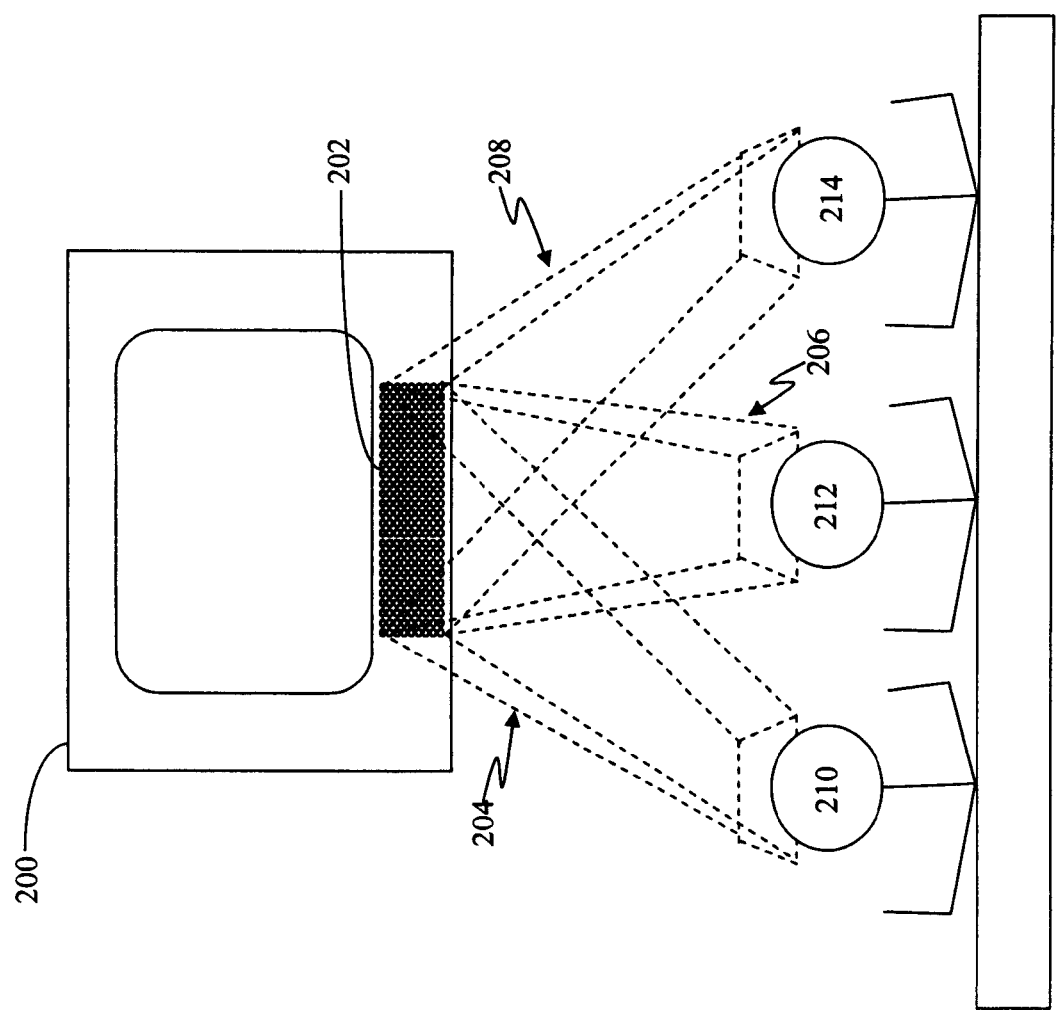
FIG. 23 shows a hypersonic transducer element array installed in a monitor that projects focused hypersonic beams.

FIG. 23 shows one application of the hypersonic transducer element array 202 that is mounted on a video terminal 200 such as a television or computer monitor, for example. The hypersonic transducer element array 202 may be used to detect a number of persons 210-214 within a predetermined space, for example. After the number of persons 210-214 is determined, the hypersonic transducer element array 202 may be used to generate focused hypersonic beams 204-208 for communication of audio information to the persons 210, 214.

The communication of audio information may be tailored for each individual 210-214. For example, the beam 204 may transmit English audio information while the beam 206 may transmit Spanish audio information while the beam 208 may transmit German audio information. Further, the audio information transmitted by the focused hypersonic beams 204-208 may be directed at neighborhoods that enclose each of the persons 210-214 and limited to such neighborhoods. Thus, other people, not shown, that may be near the persons 210-214 but outside the respective neighborhoods will not be substantially affected by the audio information delivered to the persons 210-214. The delivery of the audio information to each of the persons 210-214 may be isolated to each particular person and not "heard" by the other persons. Thus, "silent" delivery of audio information may be achieved.

In the above example, the hypersonic transducer element array 202 transmits multiple focused hypersonic beams simultaneously and each of the beams carries unique audio information from the other beams. To achieve this performance, each of the transducer elements of the hypersonic transducer element array 202 receives a signal that is a combination of all the signals that is required to generate each of the focused beams. A controller may determine the hypersonic signals required to form each of the focused hypersonic beams, determine what signal each transducer element should be driven (i.e., the delay for each of the focused hypersonic beams and the hypersonic carrier and side bands needed) and combine the signals for each transducer element before outputting to the drivers for driving the transducer elements. In this way, each of the transducer elements may drive the required signals for forming any number of beams to deliver unique audio information for each of the focused hypersonic beams.

Figure 24:
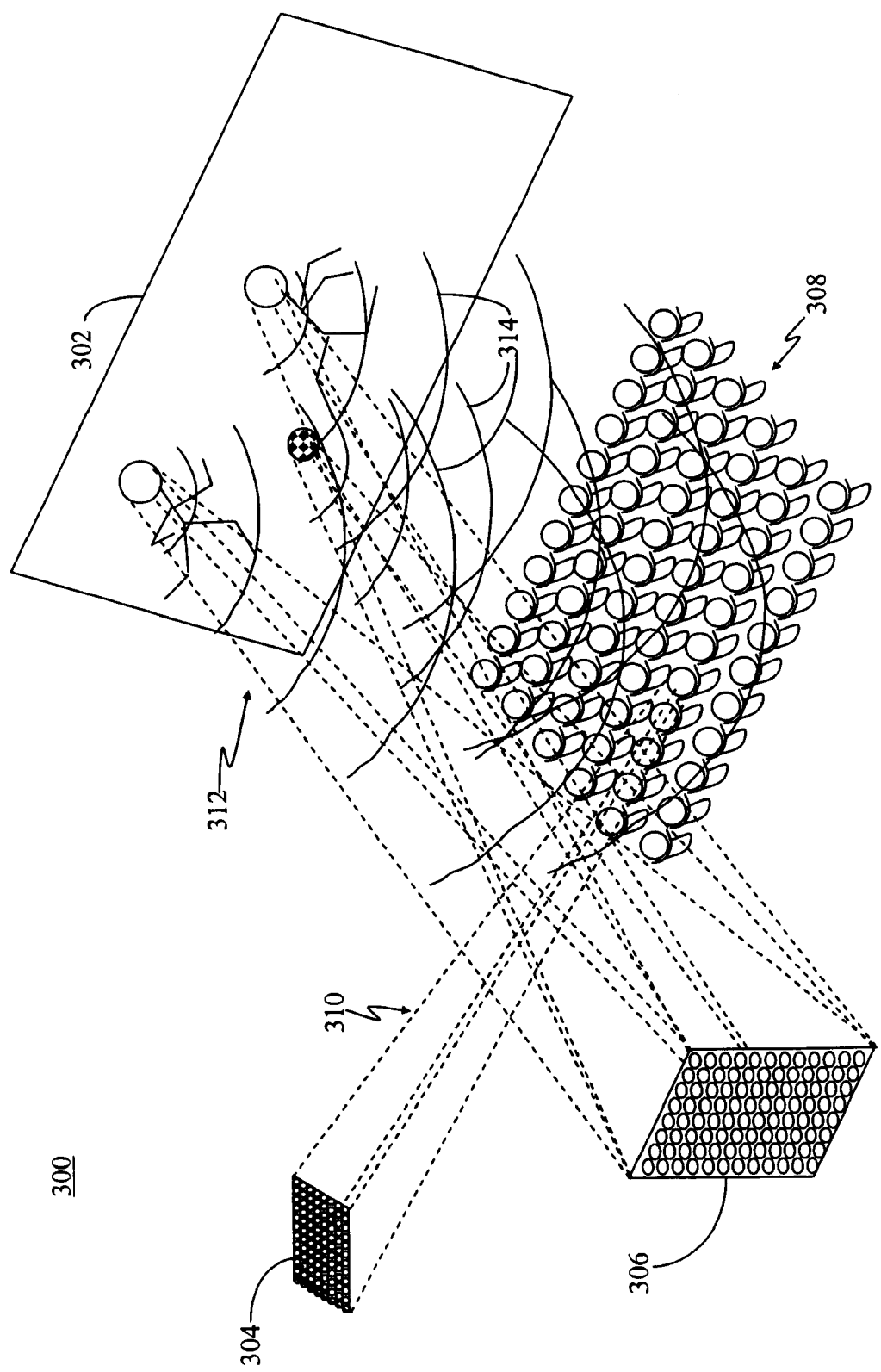
FIG. 24 shows hypersonic transducer element arrays used in a public environment.

FIG. 24 shows a possible application of multiple hypersonic transducer element arrays 304 and 306 in a theater 300, for example. Video images are shown on a display 302 to an audience 308. The hypersonic transducer element array 306 is used to project audio information to various video objects displayed on the screen via focused hypersonic beams 312. The hypersonic beams are focused so that the neighborhood of each of the beams where the hypersonic beam energy is converted into audio energy occurs at the screen and tracks each of the objects being displayed on the display 302. The audio information is reflected from the screen toward the audience 308 by audio waves 314. In this way, the audience 308 is presented with a video image in which the video characters appear to be generating sounds directly from the screen as would be if the characters were actually generating the sounds from the displayed positions.

In addition, the hypersonic transducer element array 304 may be used to deliver audio information using focused hypersonic beam 310 to specific persons in the crowd. The delivery of audio information by the hypersonic transducer element array 304 may create a neighborhood so that only one person in the crowd 308 hears the delivered message so that other persons in the audience 308 are not disturbed by the audio sounds delivered to a particular person in the audience 308.

Figure 25:
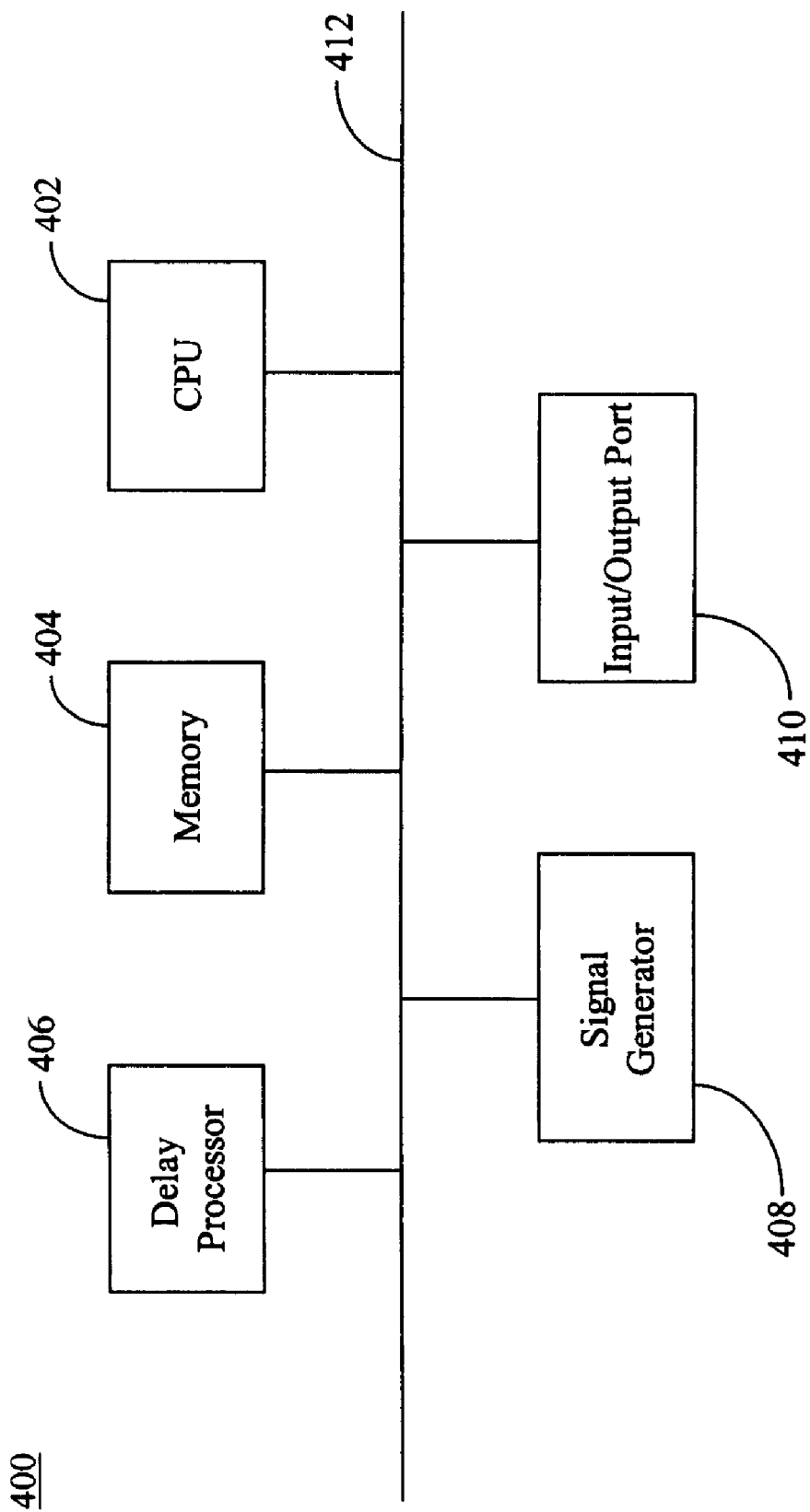
FIG. 25 shows an exemplary block diagram of a hypersonic processor.

FIG. 25 shows an exemplary block diagram of a hypersonic processor 400 that may be used to drive a hypersonic transducer element array. The hypersonic processor 400 may include a CPU 402, a memory 404, a delay processor 406, a signal generator 408 and an input/output port 410. The above components may be coupled together via a bus 412. While the hypersonic processor 400 is illustrated using a bus architecture, any other architectural configuration may be used to perform the functions of the hypersonic processor 400.

The CPU 402 may be used to control the overall process of the hypersonic processor 400. The input/output port 410 may be used to receive audio information to be transmitted and outputting signals for driving the hypersonic transducer element array.

For a pinging operation, an operator may enter parameters for a space to be pinged. This space may be of any dimension. For example, if an auditorium is pinged for locations of various groups of people, a two dimensional system may be used to perform a raster scan operation, for example. However, if the auditorium includes several balconies, then a three dimensional pinging operation may be required.

The CPU 402 may receive instructions from an operator indicating a space to be scanned via the input/output port 410. The CPU 402 initializes a coordinate system for the space of interest by storing parameters in the memory 404, for example. The CPU 402 may also determine a noise environment of the space to be pinged by receiving signals from the hypersonic transducer element array through the input/output port 410 to determine the background noise and to select a best hypersonic frequency to be used for the pinging process.

After determining the desired hypersonic frequency, the CPU 402 may initialize the hypersonic signal generator 408 to generate the selected hypersonic frequency for the pinging process. The CPU 402 may also instruct the delay processor

406 to begin generating appropriate delays for the hypersonic transducer element array based on the coordinate system parameters stored in the memory 404. The hypersonic signal generator 408, the delay processor 406 and the input/output port 410 coordinate to output the pinging hypersonic beam using the delays generated by the delay processor 406. After each ping, the hypersonic processor 400 may stop transmitting the pinging hypersonic beam and wait for an echo. Depending on the size of the auditorium, for example, the outermost walls may reflect the transmitted pinging hypersonic beam and thus sets the maximum amount of wait time that corresponds to the outermost boundaries of the auditorium. The maximum wait time may be determined by the CPU 402 before the pinging process begins so that "reverberation" from the auditorium walls may be ignored to avoid false detections.

After an appropriate wait time, the hypersonic processor 400 outputs another ping aimed at a different coordinate of the space to be scanned. After each ping, the hypersonic processor 400 waits for possible reflections from detected objects. When a reflection is detected by the hypersonic transducer element array, the coordinate of the detected object is determined by the CPU 402 and saved in the memory 404 in a table, for example.

The "wait" time between pings between scanned positions may be avoided if multiple frequencies or frequency signatures are used for consecutive pings. In this way, a "ping" frequency signal would not interfere with an "echo" frequency signal. Also, as noted above, the "ping" may be a flood light type process where a very wide beam is generated for illumination, and the echo signals may be processed simultaneously for detecting objects at multiple locations.

While the above process "maps" a space to be pinged, such mapping may not be necessary depending on the application. For example, the operator may visually identify objects in the auditorium and mark such images using a video display and a joystick or touch screen, for example. The marked coordinates may be sent to the hypersonic processor 400 either for immediate transmission of audio information or for a confirmation of hypersonic transmission parameters using a confirmation ping. For example, the conditions within an auditorium may not be at STP so that the speed of sound within the auditorium should be determined before generating a projection distance and a neighborhood for transmission. In this case, a test ping at the coordinates identified by the operator may be performed to more accurately determine audio delivery parameters so that proper and efficient delivery may be achieved.

After mapping the space designated by the operator, the hypersonic processor 400 may receive commands for transmission of audio information to particular objects identified by the mapping process. As mentioned above, the operator may explicitly identify certain objects so that the mapping process may be avoided and audio transmission may be carried out immediately.

When the operator desires to transmit audio information to specifically identified objects, the hypersonic processor may receive the audio information via the input/output port 410 and sends the audio information to the hypersonic signal generator 408. Various audio messages may be already stored in the memory 404. In this case, the hypersonic processor 400 immediately transmits the audio message. Similar to the pinging process, the CPU 402 may have already determined the most desirable hypersonic frequencies to be used for delivery of audio information based on the hypersonic noise environment, for example. The hypersonic signal generator 408 encodes the audio information into a hypersonic signal so that the response of air reproduces the audio information to be transmitted. The delay processor 406 generates delays for each of the hypersonic transducer elements of the hypersonic transducer element array based on parameters determined by the CPU 402 and delays the hypersonic signal generated by the hypersonic signal generator 408 to be output through the input/output port 410 to the hypersonic transducer element array for transmission via a focused hypersonic beam to the identified object.

While the above discussion of the functions of the hypersonic processor uses the exemplary hypersonic processor 400 illustrated in FIG. 25, similar functions may be performed by discrete components, application specific integrated circuits (ASICs), PLAs or other hardware/software or a combination for generating appropriate hypersonic signals for driving a hypersonic transducer element array to output a focused hypersonic beam for delivery of audio information. For example, software executing in the CPU 402 may perform the function of the hypersonic signal generator 400 and the delay process 406.

Figure 26:
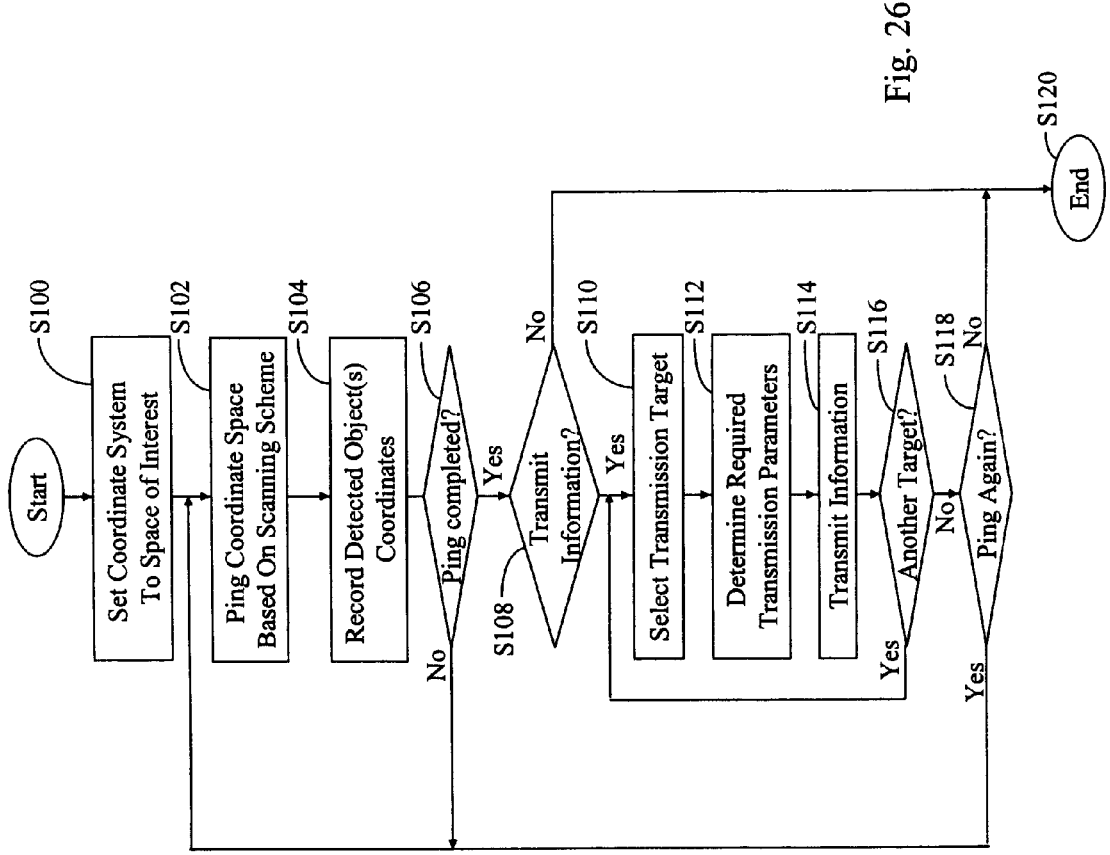
FIG. 26 shows an exemplary flowchart for pinging a space using a focused hypersonic beam and delivery of audio information using a focused hypersonic beam.

FIG. 26 shows a flowchart for an exemplary process for pinging a space of interest. In step S100, the process sets a coordinate system to cover a space of interest and the process goes to step S102. In step S102, the process pings the coordinate space based on a scanning scheme. As discussed above, the process may scan the space of interest similar to a raster scan scheme moving down along a horizontal direction in a line and then moving down an adjacent line after scanning the first horizontal line is completed In this way, the space is scanned one line at a time until the complete space is scanned. Additionally, as discussed above, the hypersonic signal used to ping a coordinate space may be determined prior to the scanning process based on the hypersonic signal noise background so that an optimal signal to noise ratio may be obtained for accurate scanning of a space. Then the process goes to step S104. Also, as indicated above, a wide area hypersonic illumination may be used so that the "scanning" is performed using the received echo signals; and multiple focused hypersonic beams may be used simultaneously to scan a space. If necessary, the different focused hypersonic beams may be distinguished from each other by encoding each of the beams with different carrier frequencies.

In step S104, the process records coordinates of detected objects based on received reflected hypersonic signals. As discussed above, the transmitted hypersonic signals may be encoded using several hypersonic frequencies as well as varying amplitudes. Additionally, outer boundaries of the space of interest may be determined either by doing initial reverberation determination (i.e., walls, posts, etc.) or an operator may enter coordinates of various boundaries so that an appropriate wait time may be determined for each ping. The process goes to step S106 and determines whether the pinging process is completed. If completed, the process goes to step S108; otherwise, the process returns to step S102.

In step S108, the process determines whether audio information is desired to be transmitted. If desired, the process goes to step S110; otherwise, the process goes to step S120 and ends. In step S110, the process selects one or more transmission targets. This selection may be directed by an operator or the target(s) may be the objects that were detected by the above pinging process. For example, the operator may desire to transmit audio information to a first object detected without detecting for another object; or, the operator may choose to transmit the audio information one or more detected objects without first mapping the complete space of interest before transmitting the audio information. For example, the focal distance of the array may be changed to maximize sensitivity for selected distances from the array or to zero in on the conditions to focus on suspected targets. Then, the process goes to step S112. In step S112, the process determines the required transmission parameters such as intensity (amplitude) of the hypersonic signal(s), the proper delays and the hypersonic signal frequencies to achieve delivery for appropriately sized neighborhoods, and the process goes to step S114. In step S114, the process transmits the one or more hypersonic signals in one or more focused hypersonic beams to deliver the audio information and goes to step S116.

The delivery of audio information can be multiplexed among objects. For example, if communication of audio information (same or different) to three objects are desired, the audio information for each of the objects may be sent in a piece wise manner so that a first piece of the respective audio information may be transmitted to each of the objects and then a second piece of the respective audio information may be transmitted, and so on. Thus, a focused hypersonic beam may be directed to each of the objects one at a time in rapid succession until all the audio information is delivered.

In step S116, the process determines whether transmission should be performed for another target. If further transmission is desired, the process goes to step S110; otherwise, the process goes to step S118. In step S118, the process determines whether another ping cycle is desired. If desired, the process goes to step S102; otherwise, the process goes to step S120 and ends.

Figure 27:
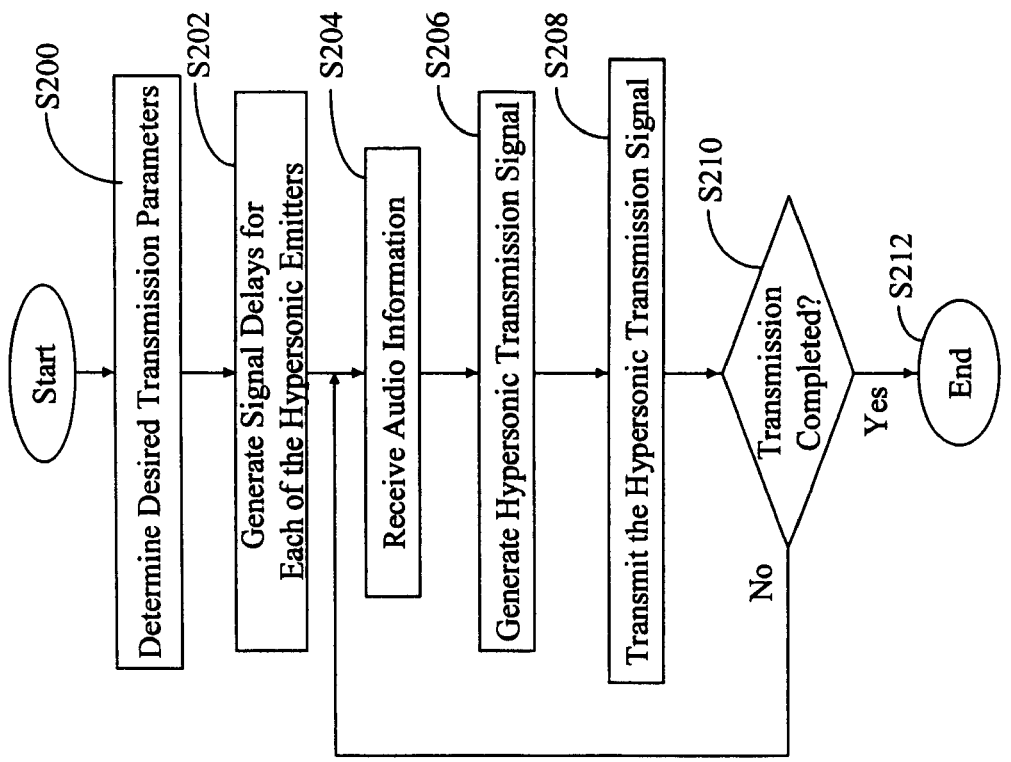
FIG. 27 shows an exemplary flowchart for operating a hypersonic transducer element array to generate a focused beam.

FIG. 27 shows an exemplary flowchart for transmitting audio information using a focused hypersonic beam. In step S200, the process determines the location of a desired neighborhood based on the current conditions of the transmission medium (e.g., air), the current noise environment, both audio and hypersonic, as well as a desired neighborhood size. The neighborhood size may be determined by a spacing between the people in the space of interest so that a smaller neighborhood size may be required for a crowded situation whereas a larger neighborhood size may be adequate for sparsely crowded areas. Then, the process goes to step S202. In step S202, the process generates signal delays for each hypersonic transducer element of a hypersonic transducer element array to achieve an appropriately focused hypersonic beam. Then, the process goes to step S204. In step S204, the process receives audio information to be transmitted and goes to step S206. As noted above, the audio information may be a standard message already stored, such as "no parking in this area." In step S206, the process generates the hypersonic transmission signal. As discussed above, the frequency and intensity of the hypersonic transmitted signal may be determined based on the hypersonic and audio noise environment. Then, the process goes to step S208. In step S208, the hypersonic transmission signal is transmitted and the process goes to step S210. In step S210, the process determines whether the transmission of all the audio information has been completed. If completed, the process goes to step S212 and ends; otherwise, the process returns to step S204.

Steps S204-S210 may be part of a high speed digital process where the audio information is received in packets. As noted above, because processors may operate at much higher rates than required for audio processing the digital information may be processed in packets and sent to circuitry such as drivers driving the hypersonic transducer element array. The digital signals may be converted to analog signals for transmission. The delivery of digital information may be at a rate high enough so that the individual packets arrive at the driver before it is needed to output the analog information. In this way, the process may use digital processing techniques to generate the hypersonic transmission signal in digital form to be converted to analog form for transmission by the hypersonic transducer element array.

As discussed above, one or more DSPs (or other electronic processors) may be used to set phases of the signals for each hypersonic transducer element. For example, if three focused beams are needed, the DSP(s) may process three signals with appropriate phases for each of the transducer elements of a hypersonic transducer element array. In this way, the hypersonic transducer element array can be used to send out hypersonic waves with multiple phases simultaneously. The superposition of such waves from the array of transducer elements results in multiple directed and focused wavefronts. Similarly, in reception mode, the same multiplicity of phases associated by the DSP(s) with the individual transducer elements allows the DSP(s) to separate the incoming wavefronts into separate signals reflected from different objects.

While the invention has been described in conjunction with exemplary embodiments, these embodiments should be viewed as illustrative, not limiting. Various modifications, substitutes or the like are possible within the spirit and scope of the invention.

What is claimed is:

1. A hypersonic transducer that forms a focused hypersonic beam, comprising:
   a substrate having a first surface and a second surface;
   a plurality of adhesive standoffs formed over the first surface of the substrate;
   a thick film having a first electrode bonded to a bottom surface of the thick film, the first electrode disposed on the adhesive standoffs;
   a second electrode disposed in a position opposing the first electrode; and
   a plurality of electric components disposed on the second surface of the substrate, the electric components connected to the first and second electrodes for driving the first and second electrodes to generate a focused hypersonic beam.

2. The hypersonic transducer of claim 1, wherein:
   the thick film is formed from a ferroelectric/piezoelectric material;
   the second electrode is bonded to a top surface of the thick film; and
   the first electrode comprising a plurality of transducer element electrodes not directly connected to each other, each of the transducer element electrodes corresponding to one of the standoffs.

3. The hypersonic transducer of claim 2, wherein:
   the adhesive standoffs are formed to have closed perimeters, the standoffs, the transducer element electrodes and the first surface of the substrate enclosing a space, the space being one of filled with a foam, substantially emptied of gas by setting a pressure using a hole formed in the substrate and connected to a space adjacent to the second surface of the substrate, the thick film and the first and second electrodes bonded to the thick film having one of concavities extending toward the second surface of the substrate and convexities extending away from the second surface of the substrate.

4. The hypersonic transducer of claim 2, further comprising:
   a second thick film bonded to the second electrode; and
   a third electrode bonded to a top surface of the second thick film, wherein:
   the third electrode comprising a plurality of second transducer element electrodes, each of the second transducer element electrodes opposes one of the transducer element electrodes that is bonded to the bottom surface of the thick film,
the first and third electrodes being driven at opposite polarities for forming the focused hypersonic beams.

5. The hypersonic transducer of claim 1, wherein:
the thick film is formed of non-ferroelectric/piezoelectric materials;
the second electrode bonded to the first surface of the substrate and comprising a plurality of transducer element electrodes not directly connected to each other, the first and second electrodes connected to the components for transmitting the focused hypersonic beams.

6. The hypersonic transducer of claim 5, wherein:
the adhesive standoffs are formed to have closed perimeters, the standoffs, the transducer element electrodes and the first surface of the substrate enclosing a space, the space being one of filled with a foam, set to a pressure different than ambient pressure using a hold formed in the substrate and connected to an air space adjacent to the second surface of the substrate, the thick film and the first and second electrodes bonded to the thick film having concavities extending toward the space.

7. A hypersonic transducer, comprising:
means for mounting a thick film having a first electrode bonded to a bottom surface of the thick film over a first surface of a substrate;
a plurality of transducer element electrodes formed on the first surface of the substrate; and
means for driving the first electrode and the transducer element electrodes for generating a focused hypersonic beam.

* * * * *

UNITED STATES PATENT AND TRADEMARK OFFICE
CERTIFICATE OF CORRECTION

| | |
|---|---|
| PATENT NO. | : 7,482,729 B2 |
| APPLICATION NO. | : 11/959118 |
| DATED | : January 27, 2009 |
| INVENTOR(S) | : David K. Biegelsen |

It is certified that error appears in the above-identified patent and that said Letters Patent is hereby corrected as shown below:

Title Page item (73), Replace assignee with the following assignee:

--Palo Alto Research Corporation Incorporated, Palo Alto, CA (US)--

Signed and Sealed this

Seventh Day of September, 2010

David J. Kappos
*Director of the United States Patent and Trademark Office*